US007104887B2

(12) United States Patent
Hughes

(10) Patent No.: US 7,104,887 B2
(45) Date of Patent: Sep. 12, 2006

(54) LOTTERY METHOD AND SYSTEM

(75) Inventor: Bryan G. Hughes, Victoria (CA)

(73) Assignee: Media Games, Inc., Victoria (CA)

( * ) Notice: Subject to any disclaimer, the term of this patent is extended or adjusted under 35 U.S.C. 154(b) by 64 days.

(21) Appl. No.: 10/072,846

(22) Filed: Feb. 6, 2002

(65) Prior Publication Data

US 2003/0148805 A1 Aug. 7, 2003

(51) Int. Cl.
*A63F 13/00* (2006.01)

(52) U.S. Cl. .......................................................... 463/17

(58) Field of Classification Search ............ 463/16–22, 463/25, 30–32, 37, 40, 42

See application file for complete search history.

(56) References Cited

U.S. PATENT DOCUMENTS 4,842,278 A 6/1989 Markowicz ............. 273/138 A
6,080,062 A 6/2000 Olson .......................... 463/42
6,251,017 B1 * 6/2001 Leason et al. ................ 463/42
6,668,177 B1 * 12/2003 Salmimaa et al. .......... 455/566
2002/0002489 A1 * 1/2002 Miller et al. .................. 705/14
2002/0037766 A1 * 3/2002 Muniz ......................... 463/17
2003/0153381 A1 * 8/2003 Slattery ....................... 463/16

FOREIGN PATENT DOCUMENTS

EP 0 310 368 A2 4/1989

OTHER PUBLICATIONS

Reference, URL = http://www.goodlot.com/goodlot/site.jsp, download date Jan. 18, 2002.

* cited by examiner

*Primary Examiner*—Kim Nguyen
(74) *Attorney, Agent, or Firm*—Seed IP Law Group PLLC

(57) ABSTRACT

In one embodiment, a method includes but is not limited to populating a lottery bet slip by use of at least one commercial icon. In another embodiment, a method includes but is not limited to comparing a lottery bet slip, populated with one or more commercial icons, against one or more winning criteria. In one or more various embodiments, related systems include but are not limited to circuitry and/or programming for effecting the foregoing-referenced method embodiments.

32 Claims, 26 Drawing Sheets

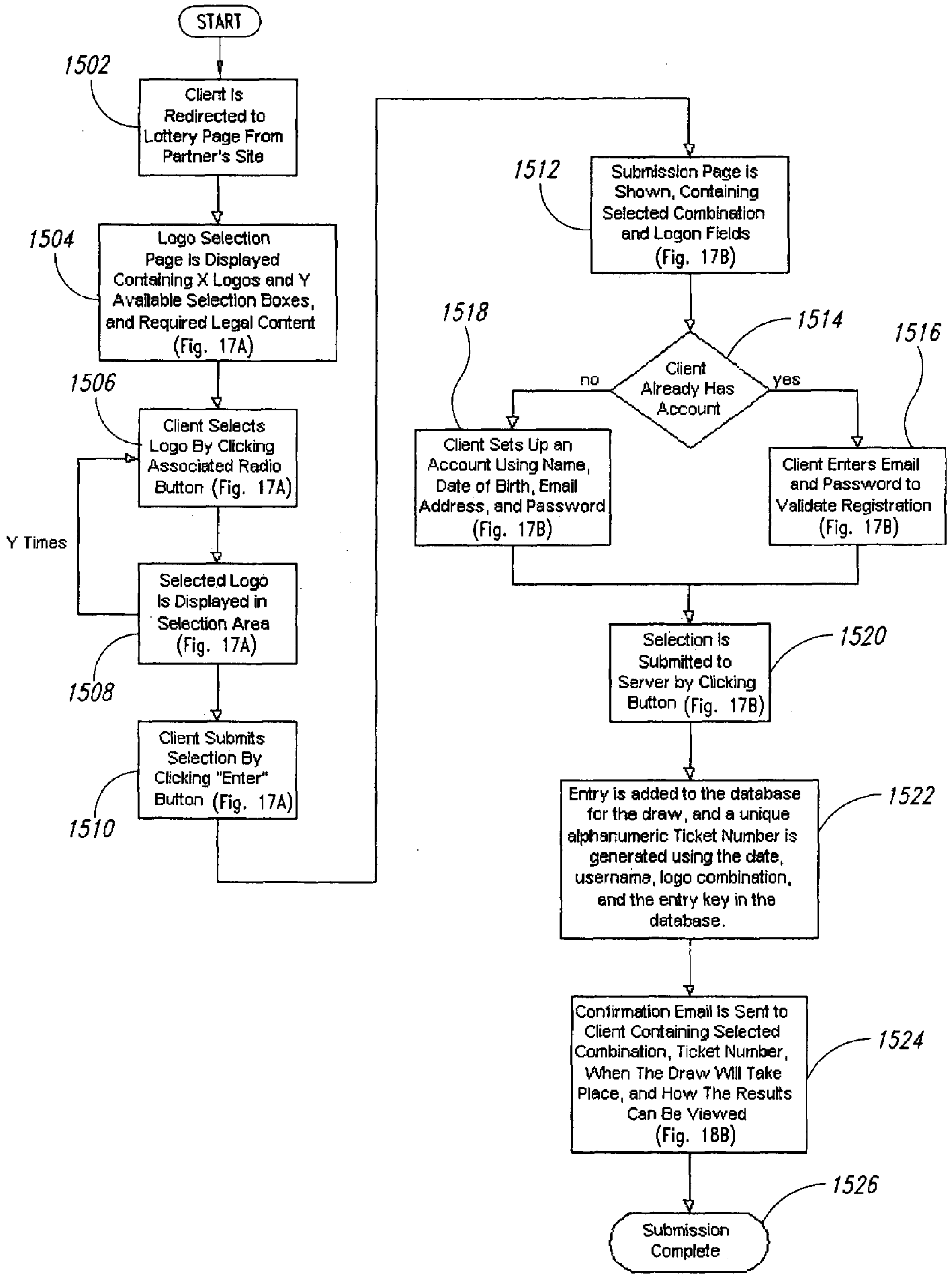
FIG. 15A Logo Lotto Entry Process Flow

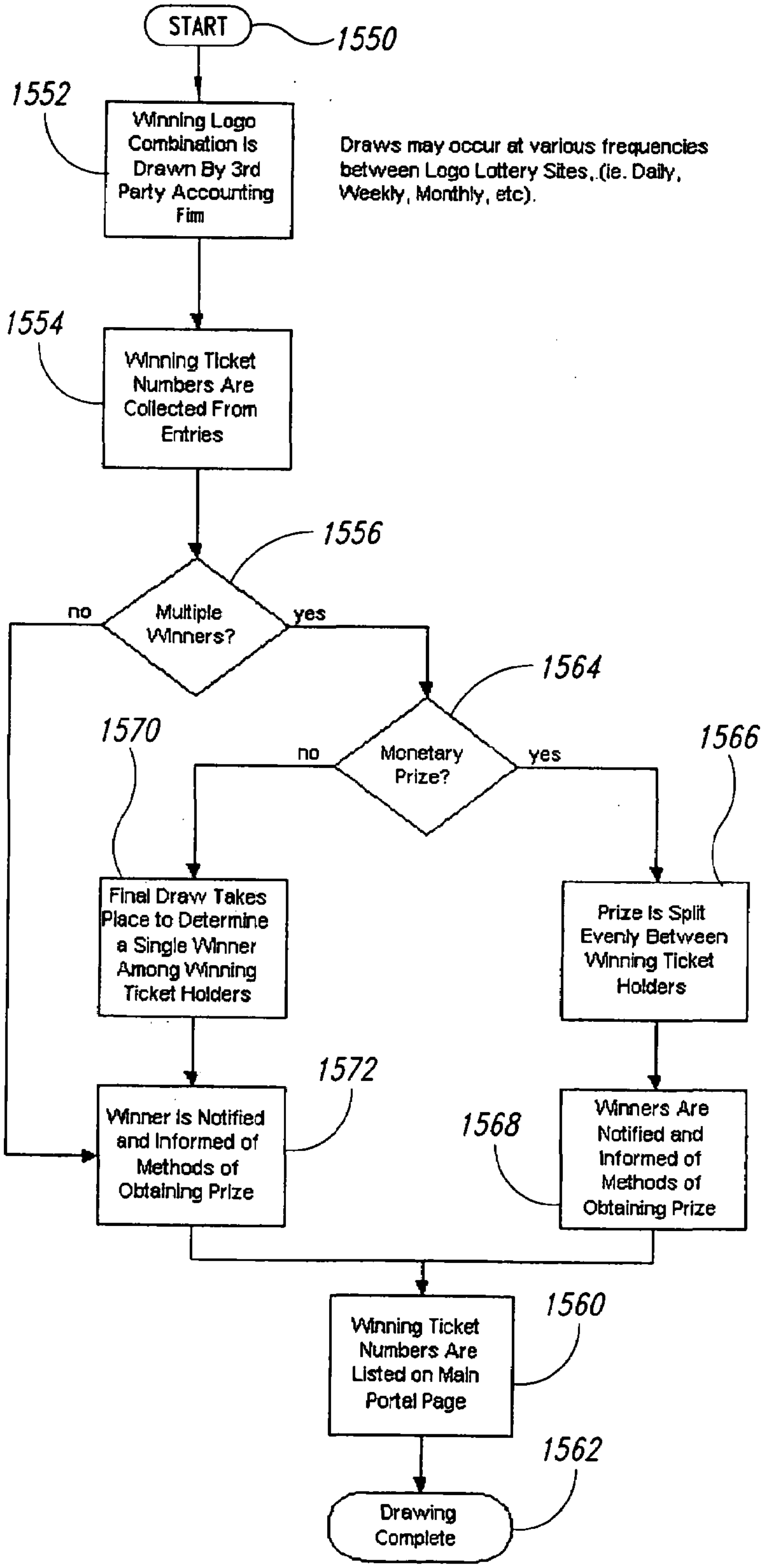
FIG. 15B Logo Lotto Drawing Process Flow

Logo Lotto Confirmation Email

LOTTERY METHOD AND SYSTEM

BACKGROUND OF THE INVENTION

1. Field of the Invention

The present application relates, in general, to lotteries.

2. Description of the Related Art

Lotteries are schemes for the distribution of prizes by lot or chance. In a typical lottery, a player buys a lottery ticket having one or more slots. Thereafter, the player fills in the one or more slots of the lottery ticket with one or more numbers picked by the player. Subsequently, the player submits the filled-in lottery ticket to the lottery authority. Thereafter, the lottery authority chooses numbers at random, and if the numbers chosen at random match the one or more numbers picked by the player, the player is deemed the lottery winner, and is given the lottery prize.

BRIEF SUMMARY OF THE INVENTION

In one embodiment, a method includes but is not limited to populating a lottery bet slip by use of at least one commercial icon. In various embodiments of the method, the at least one commercial icon is characterized by a trademark, a service mark, a commercial name, a commercial logo, a commercial slogan, a geographical mark, a commercial image, a book cover, a compact disk cover, a digital videodisk cover, a movie poster; a new movies release list, or a generic icon which constitutes a hyperlink to a commercial site. In another embodiment of the method, the at least one commercial icon is characterized by a hyperlink. In another embodiment of the method, said populating a lottery bet slip by use of at least one commercial icon is characterized by presenting one or more commercial icons; accepting input selecting the at least one commercial icon from the presented one or more commercial icons; and inserting an icon into at least one bet-slip panel of the lottery bet slip. In another embodiment of the method, said populating a lottery bet slip by use of at least one commercial icon is characterized by presenting one or more commercial icons; accepting input selecting the at least one commercial icon from the presented one or more commercial icons; and inserting the at least one commercial icon into at least one bet-slip panel of the lottery bet slip. In another embodiment of the method, said presenting one or more commercial icons is characterized by displaying the one or more commercial icons via a visual interface (e.g., a graphical user interface or print media), or transmitting the one or more commercial icons via an auditory interface (e.g., touch-tone phone, or speech recognition). In another embodiment of the method, said accepting input selecting the at least one commercial icon from the presented one or more commercial icons is characterized by accepting input selecting one or more option indicators respectively associated with the presented one or more commercial icons. In another embodiment of the method, said accepting input selecting one or more option indicators respectively associated with the presented one or more commercial icons is characterized by accepting the input via a visual interface, or accepting the input via an auditory interface. In another embodiment of the method, inserting the at least one commercial icon into at least one bet-slip panel of the lottery bet slip is characterized by presenting the lottery bet slip having at least one bet-slip panel filled with the at least one commercial icon. In another embodiment of the method, said presenting the lottery bet slip having at least one bet-slip panel filled with the at least one commercial icon is characterized by displaying the lottery bet slip via a visual interface, or transmitting the lottery bet slip via an auditory interface. In another embodiment of the method, the method includes but is not limited to betting the lottery bet slip. In another embodiment of the method, said betting the lottery bet slip is characterized by accepting input which triggers said betting. In another embodiment of the method, said accepting input which triggers said betting is characterized by accepting the input via a visual interface, or accepting the input via an auditory interface. In another embodiment of the method, said betting the lottery bet slip is characterized by submitting the lottery bet slip to a lottery administrator. In another embodiment of the method, said submitting the lottery bet slip to a lottery administrator is characterized by transmitting the lottery bet slip to the lottery administrator program via a communications link.

In one or more various embodiments, related systems include but are not limited to circuitry and/or programming for effecting the foregoing-referenced method embodiments; the circuitry and/or programming can be virtually any combination of hardware, software, and/or firmware configured to effect the foregoing- referenced method embodiments depending upon the design choices of the system designer.

In one embodiment, a method includes but is not limited to comparing a lottery bet slip, populated with one or more commercial icons, against one or more winning criteria. In various other embodiments of the method, the one or more commercial icons are characterized by a trademark, a service mark, a commercial name, a commercial logo; or a commercial corporate slogan, a geographical mark, a commercial image, a book cover, a compact disk cover, a digital videodisk cover, a movie poster, a new movies release list, or a new music release list, or a generic icon which constitutes a hyperlink to a commercial site. In another embodiment of the method, the one or more commercial icons are characterized by a hyperlink. In another embodiment of the method, said comparing a lottery bet slip, populated with one or more commercial icons, against one or more winning criteria is characterized by receiving the lottery bet slip via a communications link. In another embodiment of the method, said comparing a lottery bet slip, populated with one or more commercial icons, against one or more winning criteria is characterized by comparing a content of the one or more commercial icons in bet-slip panels of the lottery bet slip against a content of any one or more commercial icons in bet-slip panels of a master bet slip. In another embodiment of the method, said wherein said comparing a lottery bet slip, populated with one or more commercial icons, against one or more winning criteria is characterized by comparing a position of the one or more commercial icons in bet-slip panels of the lottery bet slip against a position of any one or more commercial icons in bet-slip panels of a master bet slip. In another embodiment of the method, said comparing a lottery bet slip, populated with one or more commercial icons, against one or more winning criteria is characterized by logging the one or more commercial icons. In another embodiment of the method, the method includes but is not limited to transmitting a winning notification in response to said comparing showing that at least a part of the one or more winning criteria has been met. In another embodiment of the method, said transmitting a winning notification in response to said comparing showing that at least a part of the one or more winning criteria has been met is characterized by transmitting the winning notification when a content of at least one of one or more commercial icons in bet-slip panels of the lottery bet slip matches a content of at least one of one or more commercial icons in bet-slip panels of a master bet slip. In another embodiment of the method, said transmitting a winning notification in response to said comparing showing that at least a part of the one or more winning criteria has been met is characterized by: transmitting the winning notification when a position of at least one of one or more commercial icons in bet-slip panels of the lottery bet slip matches a position of at least one of the one or more commercial icons in bet-slip panels of a master bet slip. In another embodiment of the method, the method includes but is not limited to transmitting a bet confirmation. In another embodiment of the method, said transmitting a bet confirmation is characterized by transmitting the bet confirmation with a content of at least one of the one or more commercial icons. In another embodiment of the method, the one or more commercial icons are characterized by a hyperlink.

In one or more various embodiments, related systems include but are not limited to circuitry and/or programming for effecting the foregoing-referenced method embodiments; the circuitry and/or programming can be virtually any combination of hardware, software, and/or firmware configured to effect the foregoing- referenced method embodiments depending upon the design choices of the system designer.

In one embodiment, a method includes but is not limited to presenting one or more commercial icons in conjunction with a lottery bet slip capable of being populated by use of at least one of the one or more commercial icons. In various other embodiments of the method, the one or more commercial icons are characterized by a trademark, a service mark, a commercial name, a commercial logo; or a commercial corporate slogan, a geographical mark, a commercial image, a book cover, a compact disk cover, a digital videodisk cover, a movie poster, a new movies release list, or a new music release list, or a generic icon which constitutes a hyperlink to a commercial site. In another embodiment of the method, the one or more commercial icons are characterized by a hyperlink. In another embodiment of the method, said presenting one or more commercial icons in conjunction with a lottery bet slip capable of being populated by use of at least one of the one or more commercial icons is characterized by displaying the one or more commercial icons in conjunction with the lottery bet slip via a visual interface, or transmitting the one or more commercial icons in conjunction with the lottery bet slip via an auditory interface. In another embodiment, the method includes but is not limited to accepting input activating at least one hyperlink associated with the at least one of the one or more commercial icons. In another embodiment of the method, said accepting input activating at least one hyperlink associated with the at least one of the one or more commercial icons is characterized by accepting the input via a visual interface, or accepting the input via an auditory interface.

In one or more various embodiments, related systems include but are not limited to circuitry and/or programming for effecting the foregoing-referenced method embodiments; the circuitry and/or programming can be virtually any combination of hardware, software, and/or firmware configured to effect the foregoing-referenced method embodiments depending upon the design choices of the system designer.

In one embodiment, a method includes but is not limited to populating a game-of-chance entry by use of at least one commercial icon. In various embodiments of the method, the at least one commercial icon is characterized by a trademark, a service mark, a commercial name, a commercial logo, a commercial slogan, a geographical mark, a commercial image, a book cover, a compact disk cover, a digital videodisk cover, a movie poster; a new movies release list, or a generic icon which constitutes a hyperlink to a commercial site. In another embodiment of the method, the at least one commercial icon is characterized by a hyperlink. In another embodiment of the method, said populating a game-of-chance entry by use of at least one commercial icon is characterized by presenting one or more commercial icons, accepting input selecting the at least one commercial icon from the presented one or more commercial icons, and inserting an icon into at least at least one panel of the game-of-chance entry. In another embodiment of the method, said populating at least one game-of-chance entry by use of at least one commercial icon is characterized by presenting one or more commercial icons, accepting input selecting the at least one commercial icon from the presented one or more commercial icons, and inserting the at least one commercial icon into at least one panel of the game-of-chance entry. In another embodiment, the method includes but is not limited to betting the populated game-of-chance entry. In another embodiment of the method, said betting the populated game-of-chance entry is characterized by accepting input which triggers said betting. In another embodiment of the method, said betting the populated game-of-chance entry is characterized by transmitting the populated game-of-chance entry to a lottery administrator.

In one or more various embodiments, related systems include but are not limited to circuitry and/or programming for effecting the foregoing-referenced method embodiments; the circuitry and/or programming can be virtually any combination of hardware, software, and/or firmware configured to effect the foregoing- referenced method embodiments depending upon the design choices of the system designer.

In one embodiment, a method includes but is not limited to comparing a game-of-chance entry, populated with one or more commercial icons, against one or more winning criteria. In another embodiment of the method, the one or more commercial icons are characterized by a trademark, or a service mark. In another embodiment of the method, the one or more commercial icons are characterized by a commercial name, a commercial logo, a commercial corporate slogan, a geographical mark, a commercial image, a book cover; a compact disk cover, a digital videodisk cover, a movie poster, a new movies release list; a new music release list, or a generic icon which constitutes a hyperlink to a commercial site. In another embodiment of the method, the one or more commercial icons are characterized by a hyperlink. In another embodiment of the method, said comparing a game-of-chance entry, populated with one or more commercial icons, against one or more winning criteria is characterized by receiving the game-of-chance entry via a communications link. In another embodiment of the method, said comparing a game-of-chance entry, populated with one or more commercial icons, against one or more winning criteria is characterized by logging the one or more commercial icons. In another embodiment, the method includes but is not limited to transmitting a winning notification in response to said comparing showing that at least a part of the one or more winning criteria has been met. In another embodiment, the method includes but is not limited to transmitting a bet confirmation. In another embodiment of the method, said transmitting a bet confirmation is characterized by transmitting the bet confirmation with a content of at least one of the one or more commercial icons. In another embodiment of the method, the one or more commercial icons are characterized by a hyperlink.

In one or more various embodiments, related systems include but are not limited to circuitry and/or programming for effecting the foregoing-referenced method embodiments;

the circuitry and/or programming can be virtually any combination of hardware, software, and/or firmware configured to effect the foregoing- referenced method embodiments depending upon the design choices of the system designer.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the non-limiting detailed description set forth herein.

BRIEF DESCRIPTION OF THE SEVERAL VIEWS OF THE DRAWING(S)

FIGS. 2A–F illustrates a series of screenshots of a GUI 240 used in one implementation of method step 202 (populating a lottery bet slip by use of at least one commercial icon).

Figure 2:
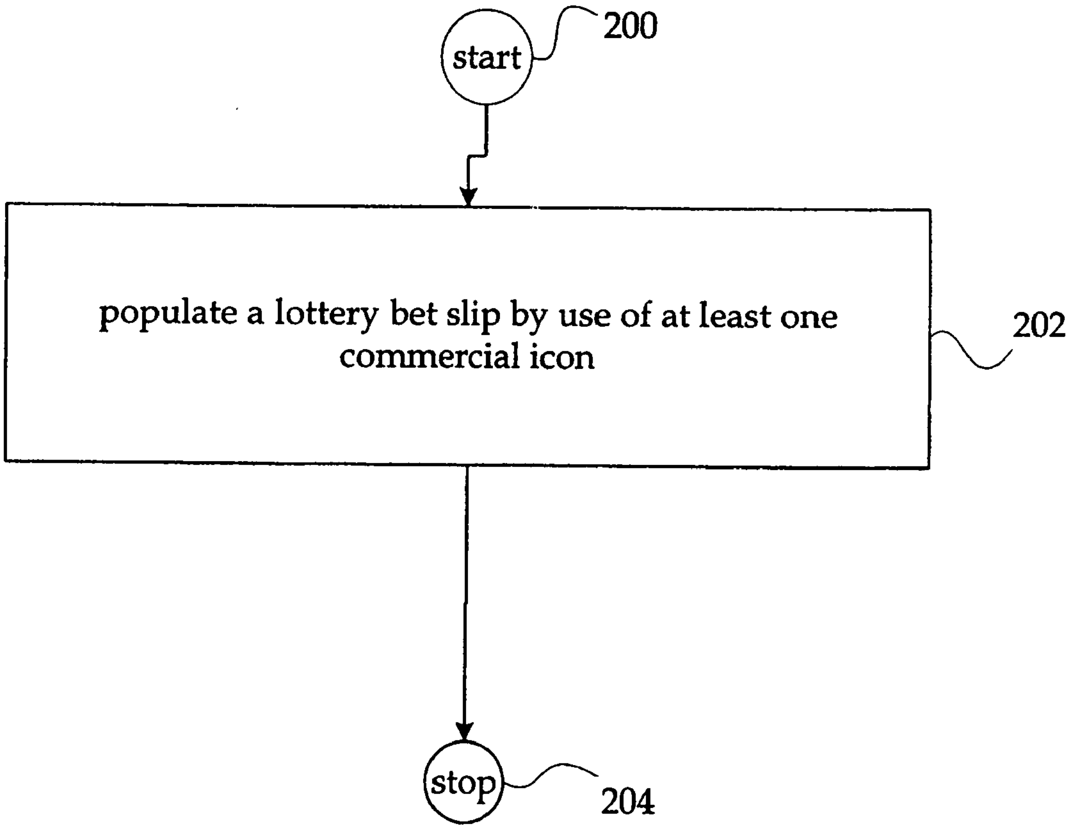
FIG. 2 depicts a high-level logic flowchart illustrating a process.
Figure 3:
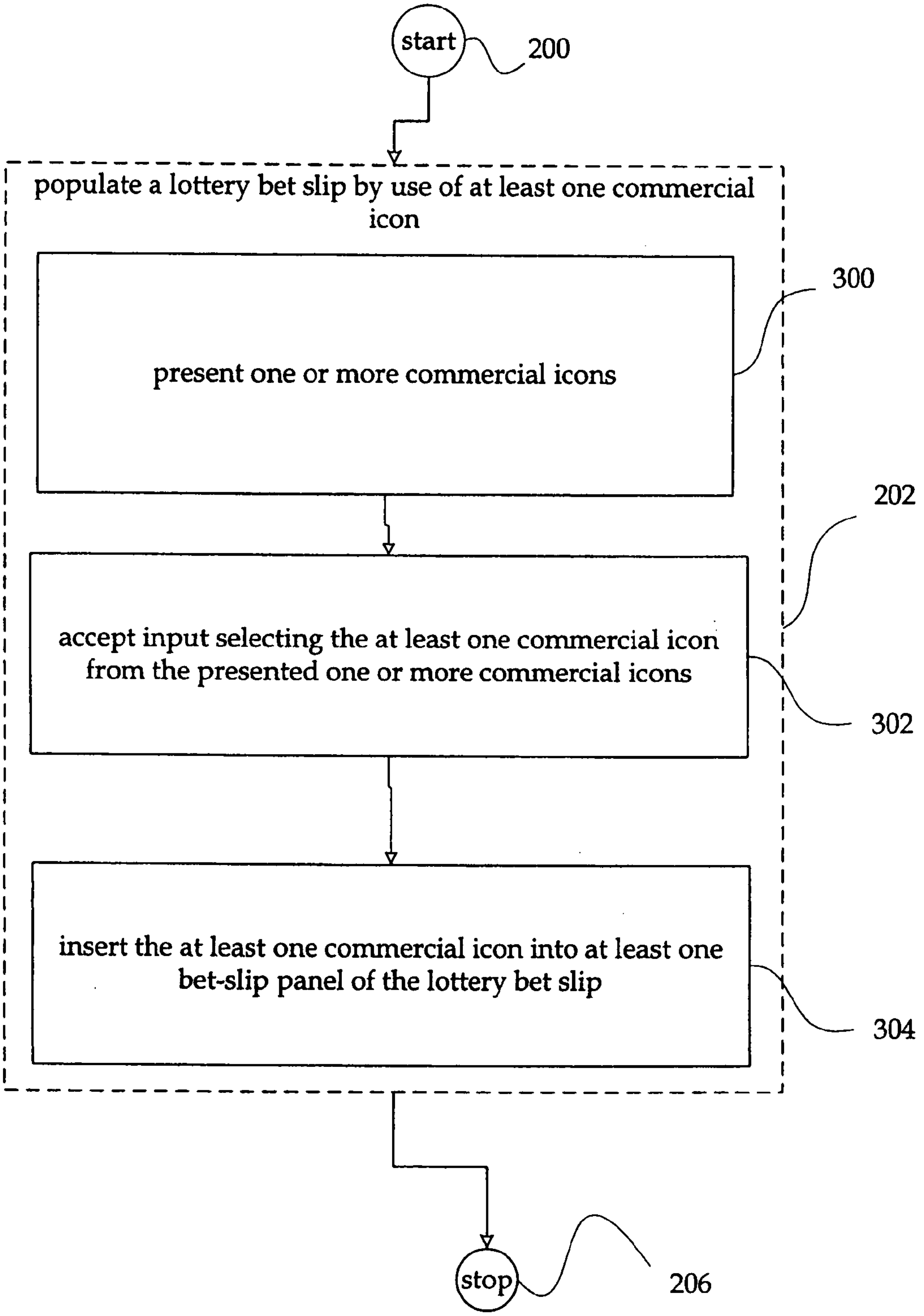

FIG. 3 illustrates a high-level logic flowchart showing an alternate implementation of the process depicted in FIG. 2.

Figure 4:
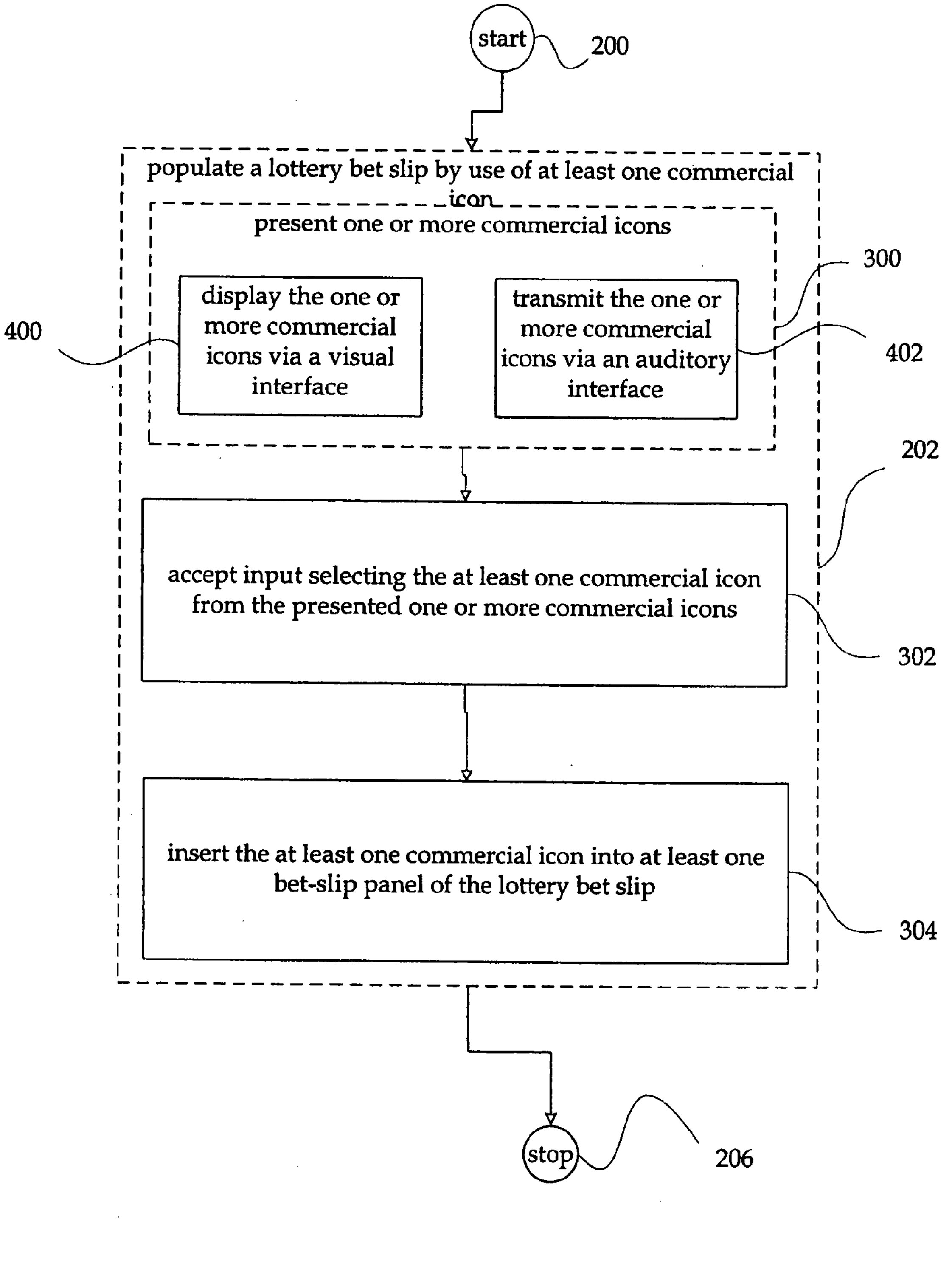

FIG. 4 shows a high-level logic flowchart depicting alternate implementations of the process depicted in FIG. 3.

Figure 5:
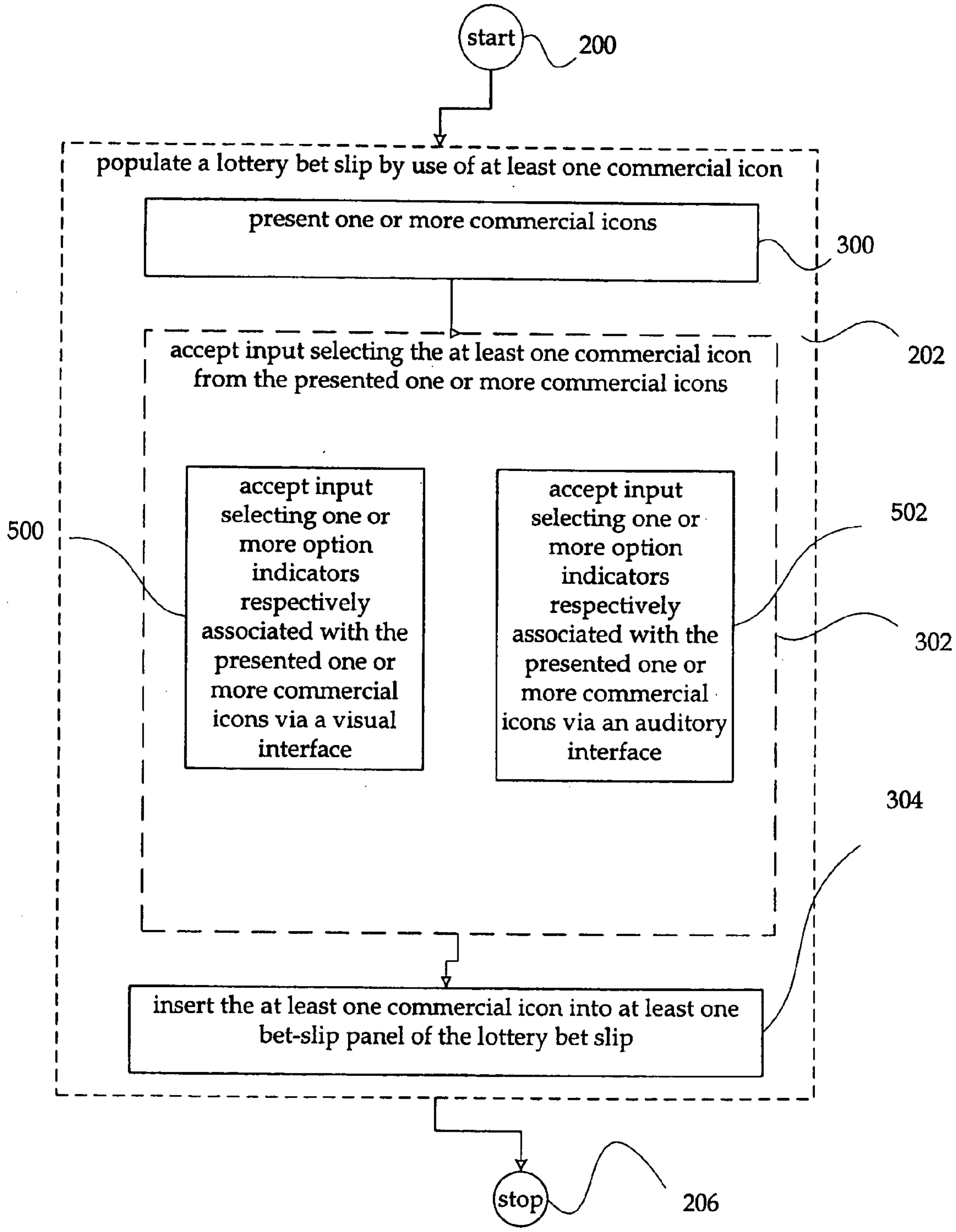

FIG. 5 shows a high-level logic flowchart depicting alternate implementations of the process depicted in FIG. 3.

Figure 6:
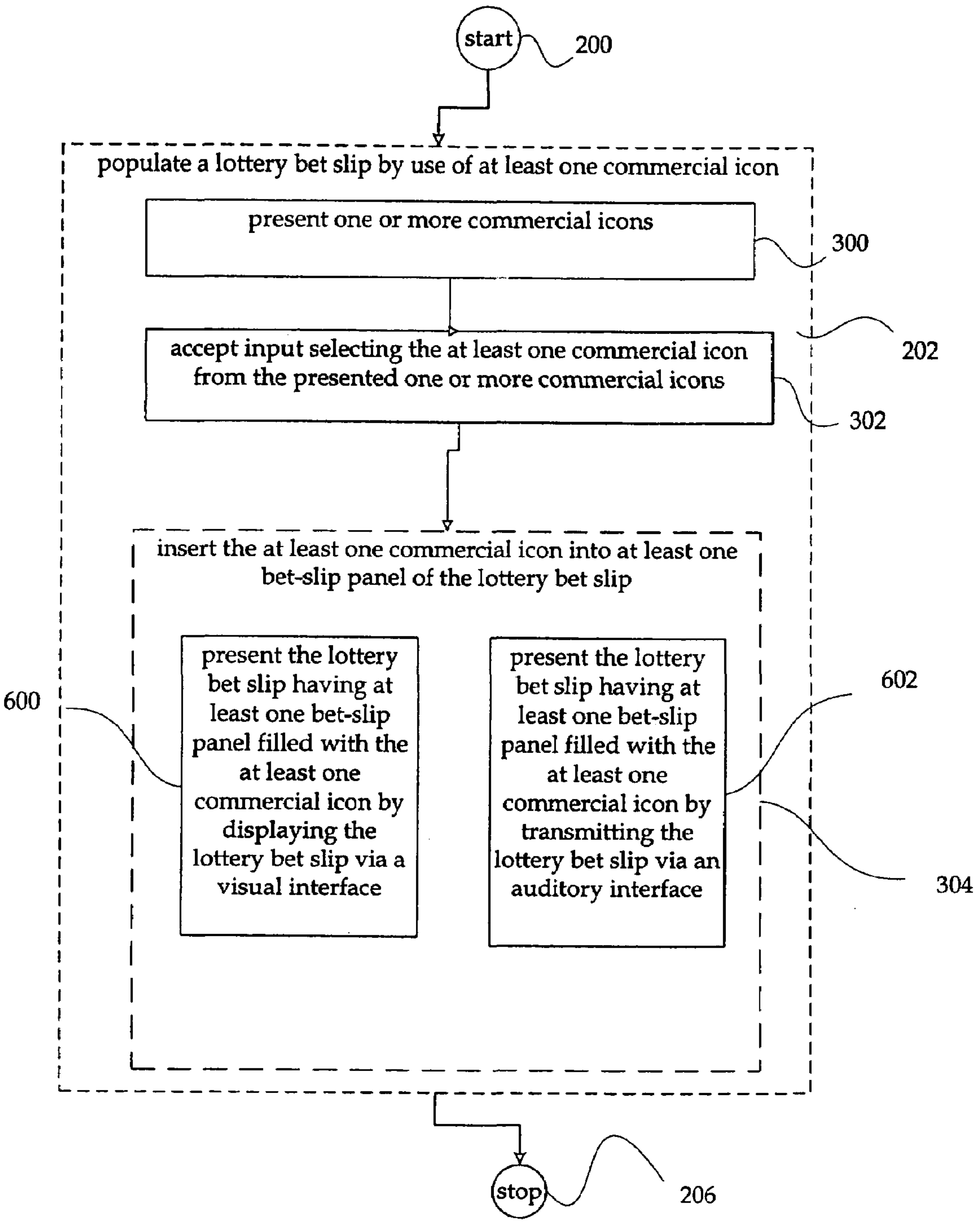

FIG. 6 shows a high-level logic flowchart depicting alternate implementations of the process depicted in FIG. 3.

Figure 7:
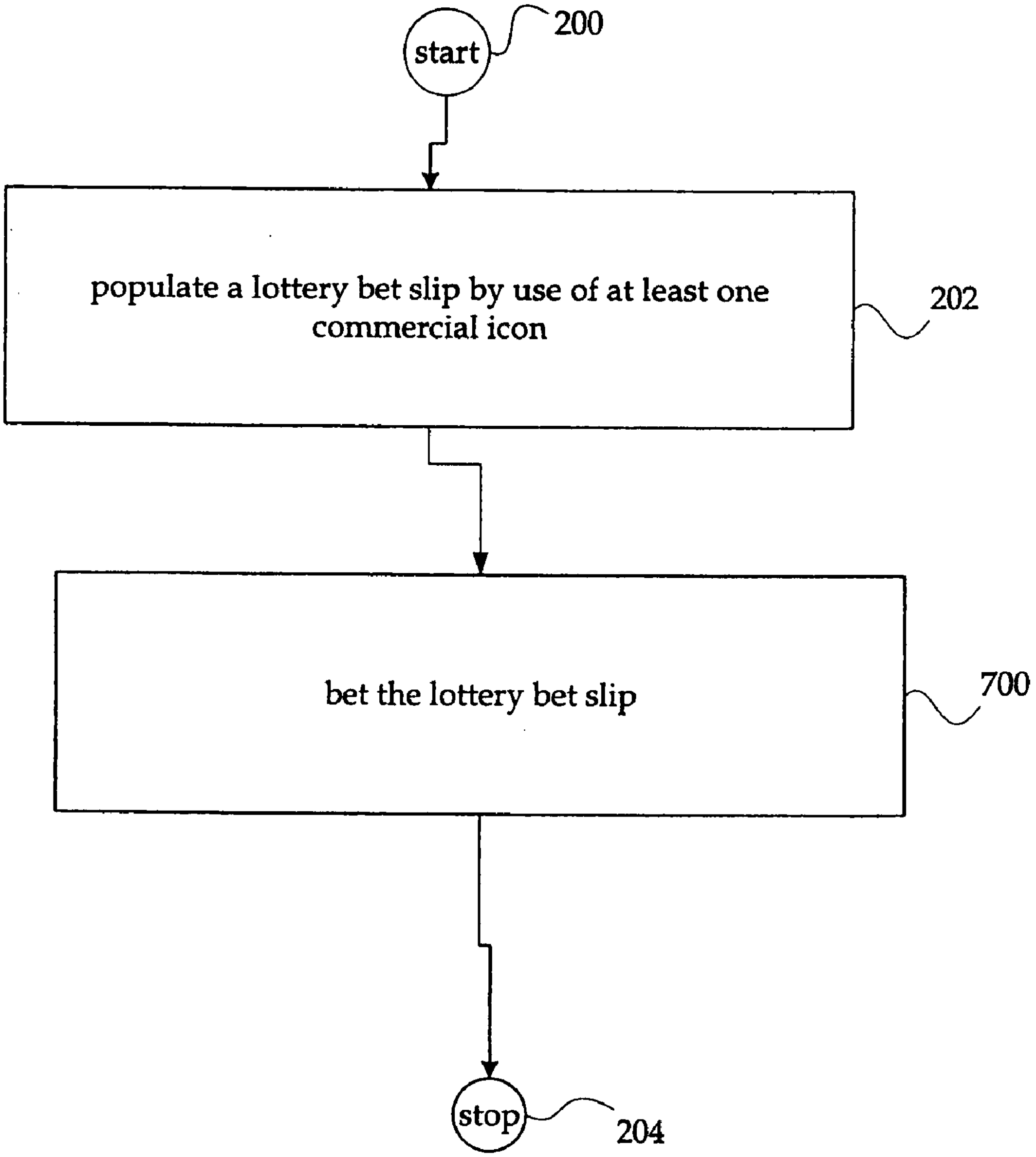

FIG. 7 illustrates a high-level logic flowchart showing an alternate implementation of the process depicted in FIG. 2.

Figure 8:
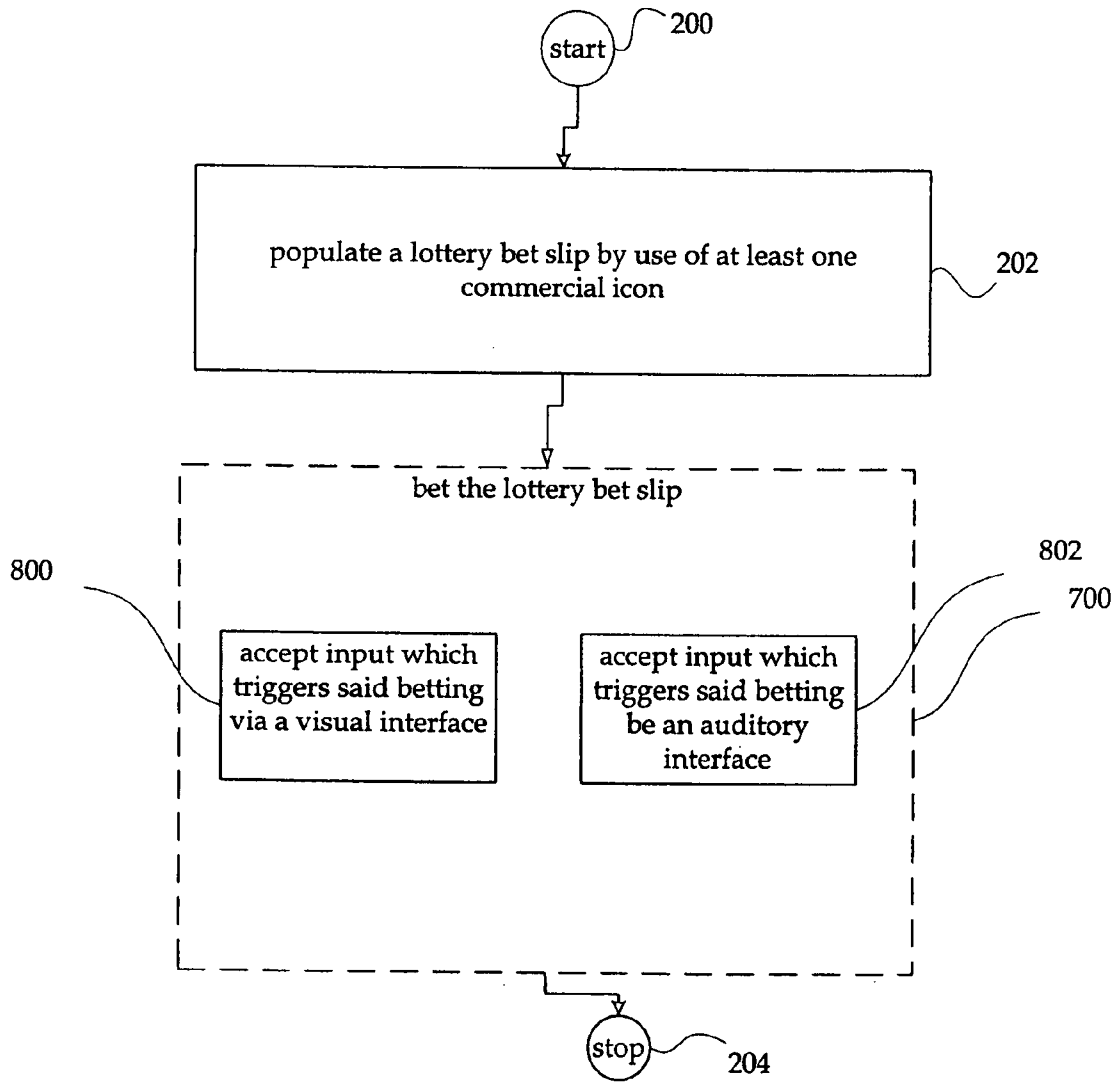

FIG. 8 shows a high-level logic flowchart depicting alternate implementations of the process depicted in FIG. 7.

Figure 9:
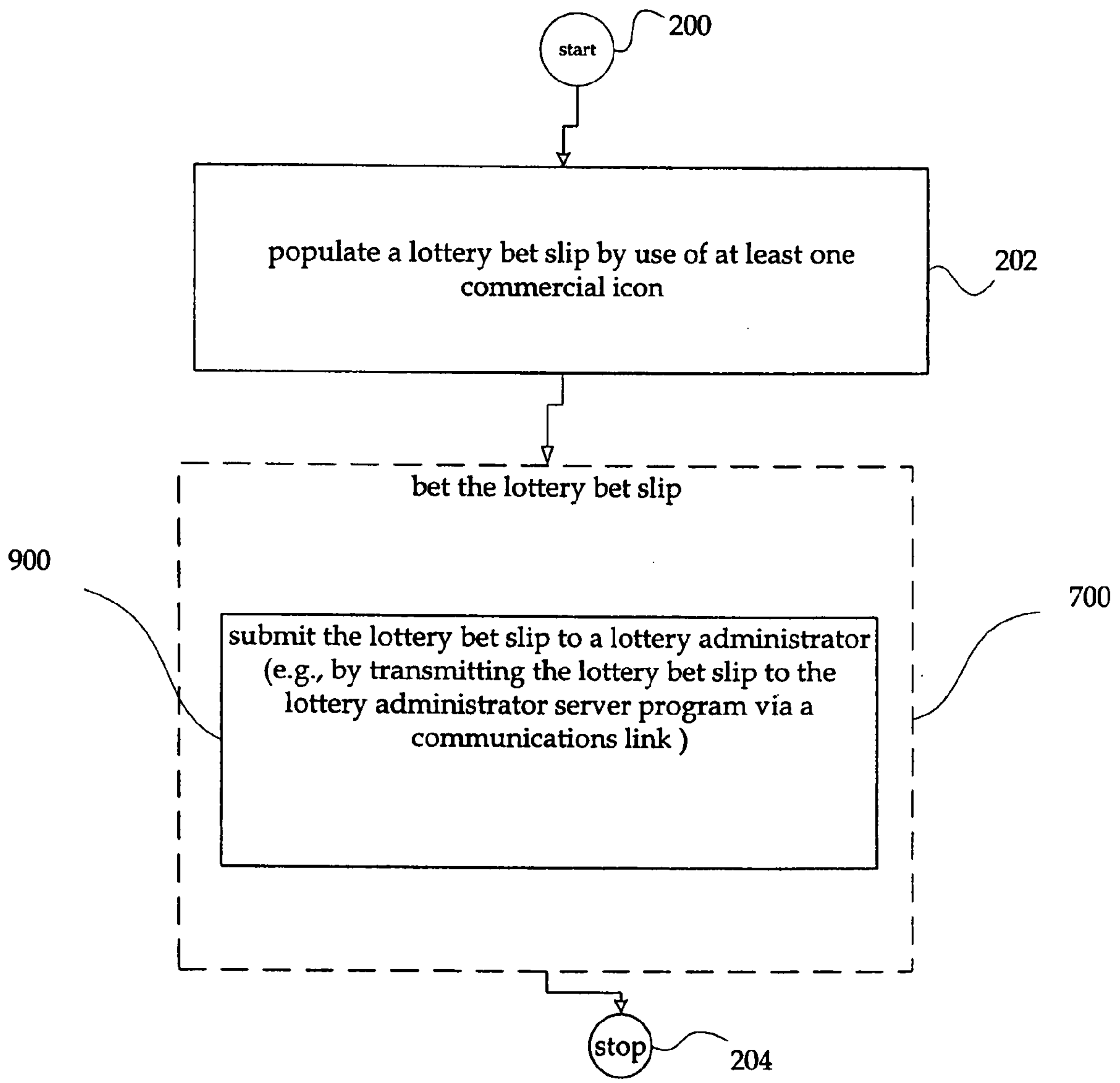

FIG. 9 shows a high-level logic flowchart depicting an alternate implementation of the process depicted in FIG. 7.

Figure 10:
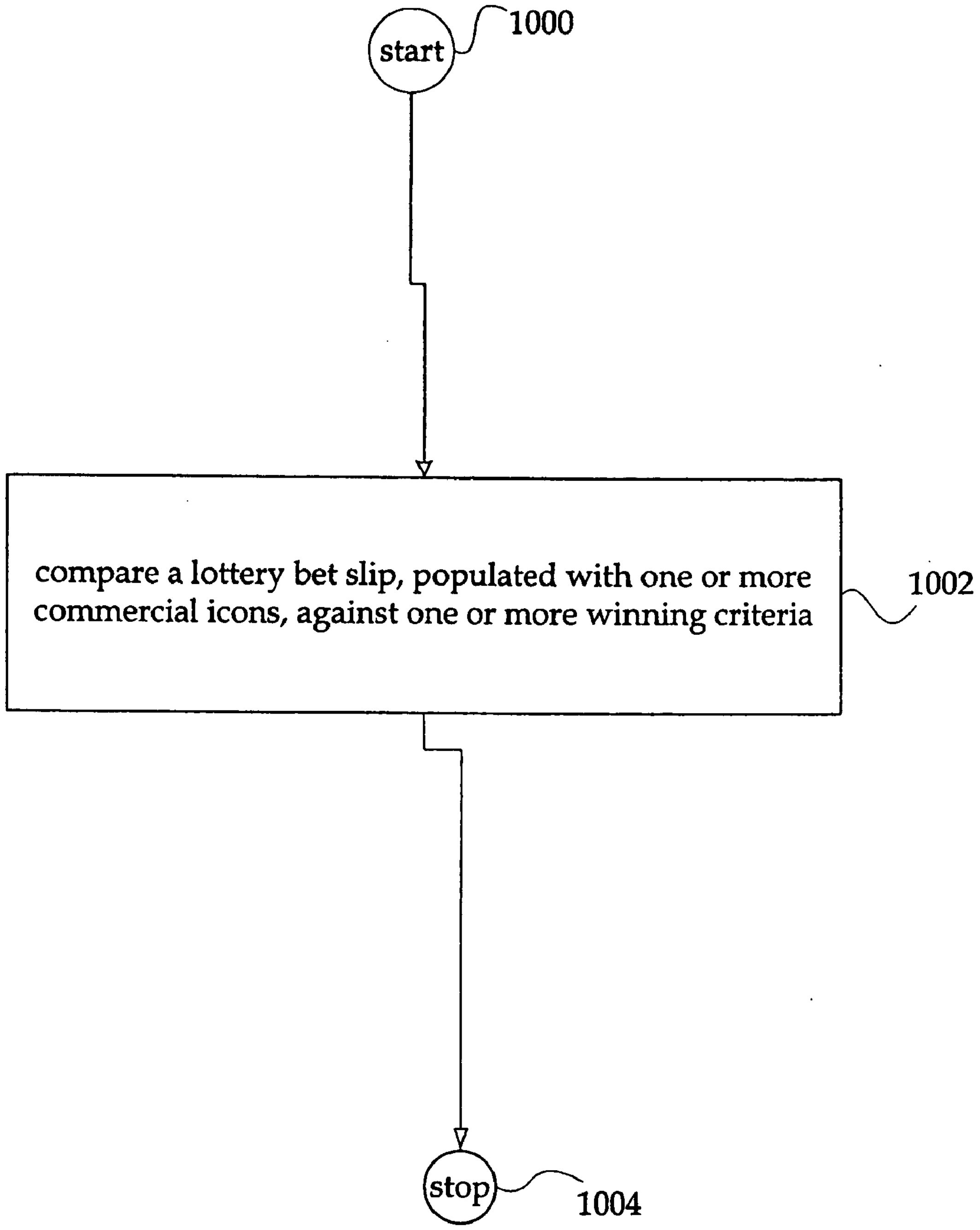

FIG. 10 depicts a high-level logic flowchart illustrating a process.

Figure 11:
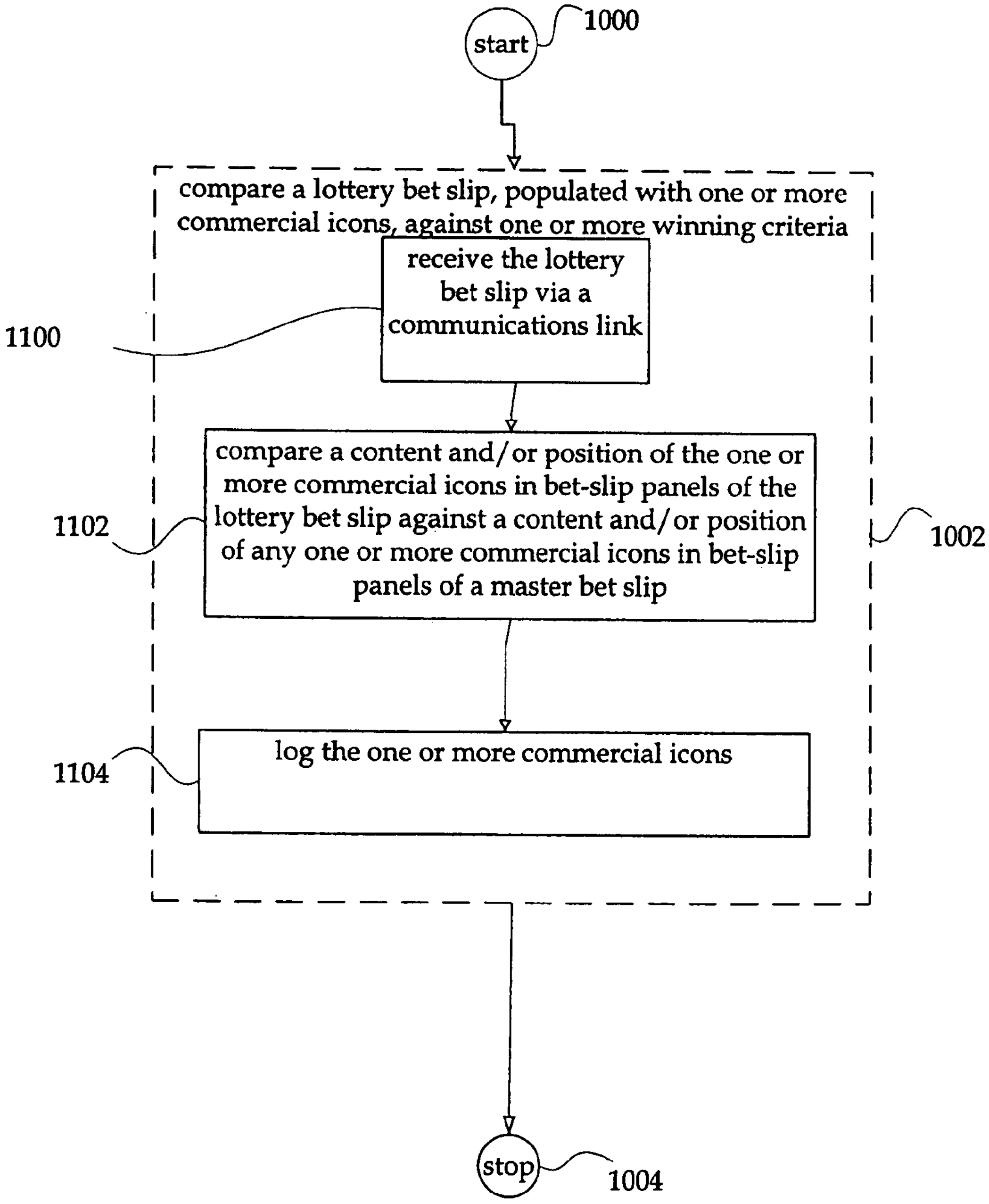

FIG. 11 illustrates a high-level logic flowchart showing an alternate implementation of the process depicted in FIG. 10.

Figure 12:
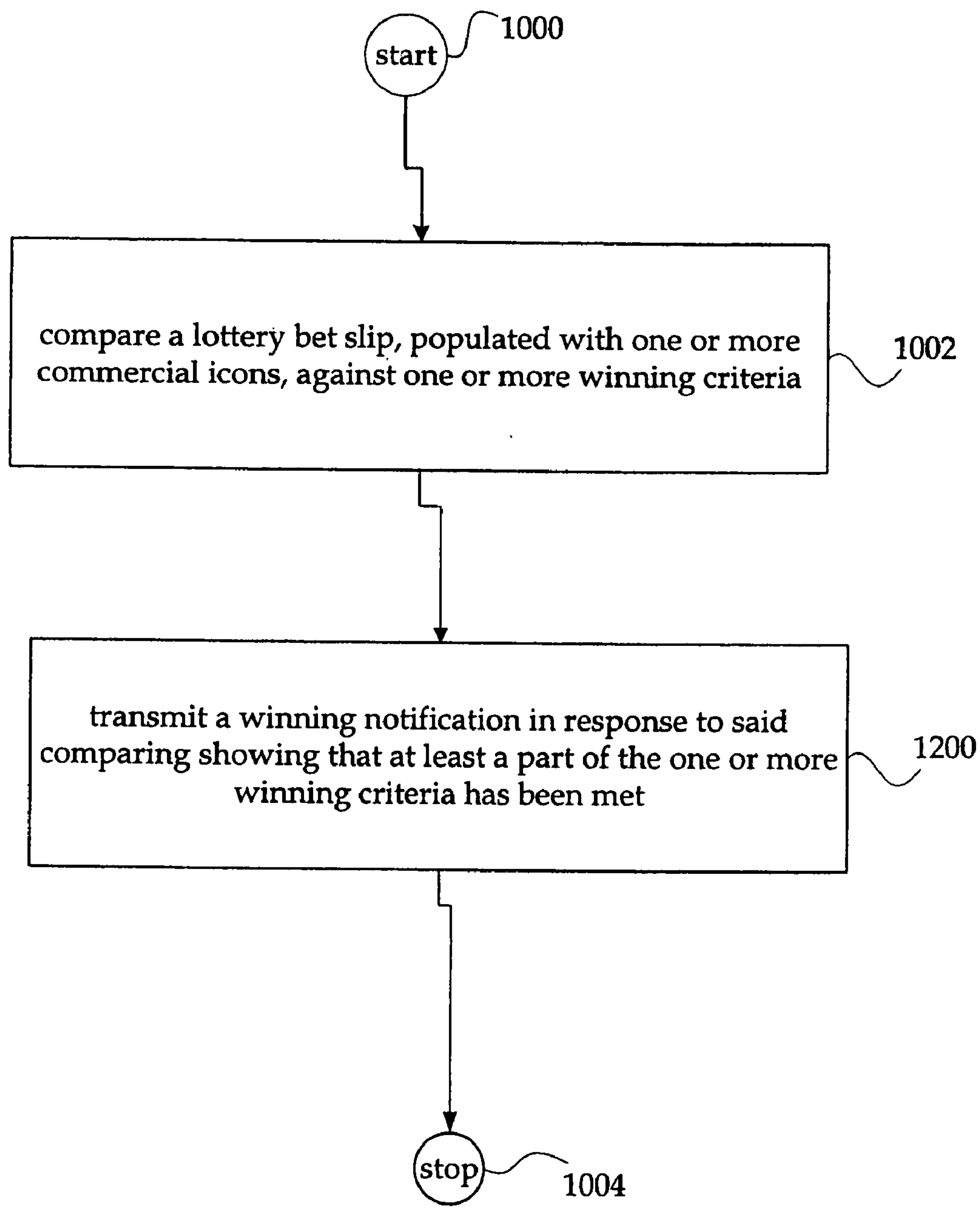

FIG. 12 illustrates a high-level logic flowchart showing alternate implementations of the process depicted in FIG. 10.

Figure 13:
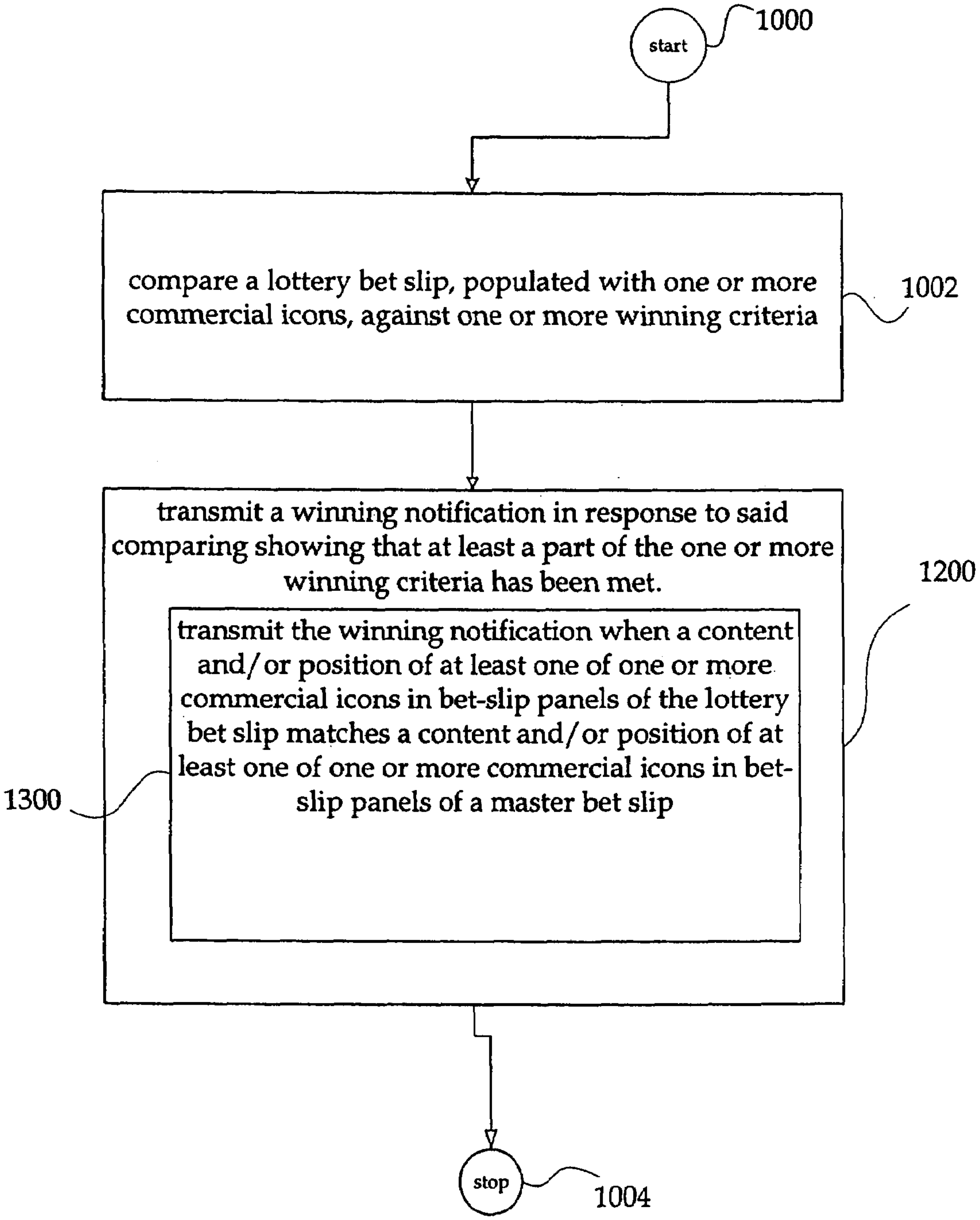

FIG. 13 shows a high-level logic flowchart depicting alternate implementations of the process depicted in FIG. 12.

Figure 14:
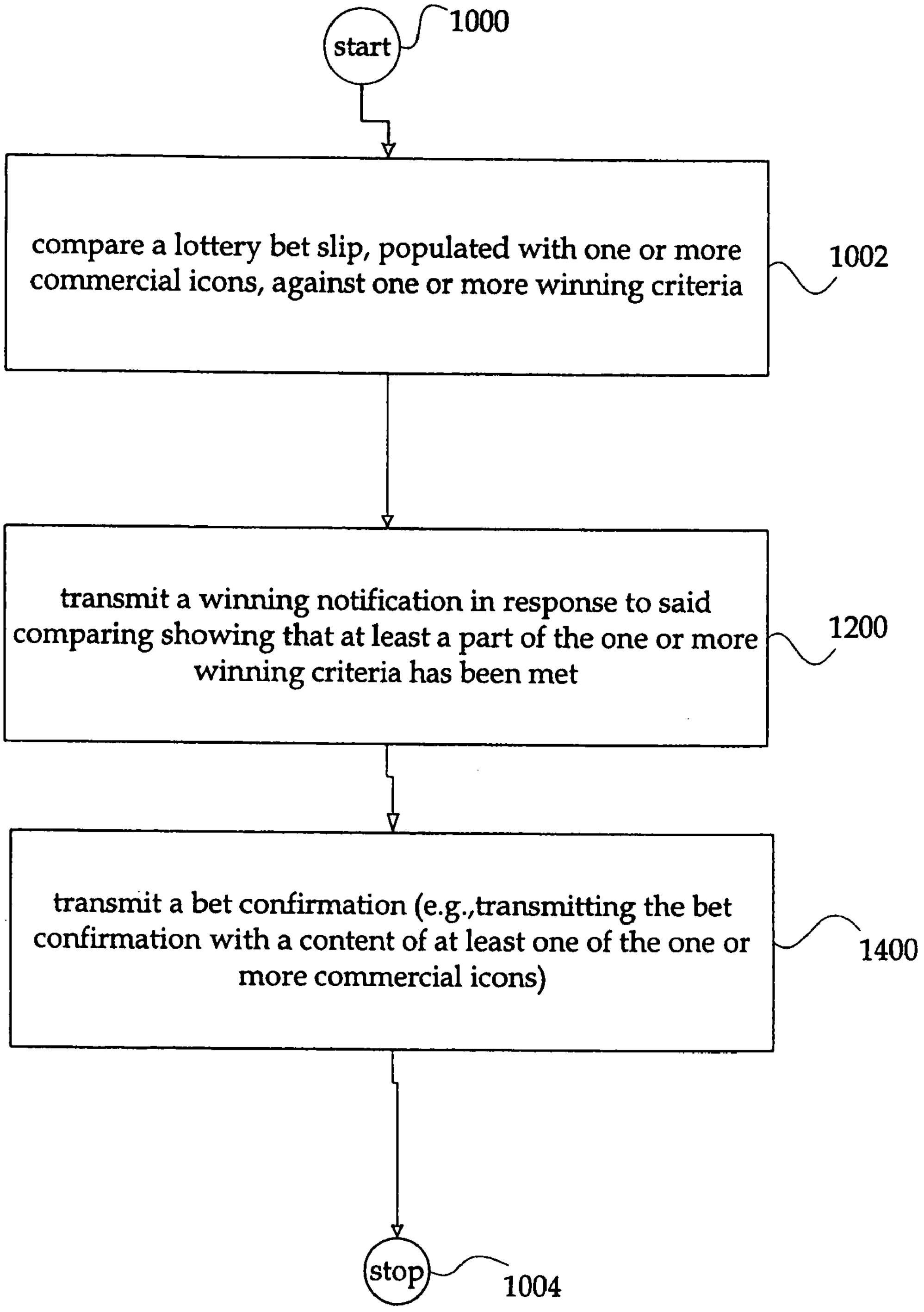

FIG. 14 illustrates a high-level logic flowchart showing alternate implementations of the process depicted in FIG. 12.

FIG. 15A shows a high-level logic flowchart depicting an implementation of a process flow associated with a user betting a lottery bet slip.

FIG. 15B shows a high-level logic flowchart depicting an implementation of a process flow associated with a lottery-authority server drawing one or more winning lottery tickets.

Figure 16:
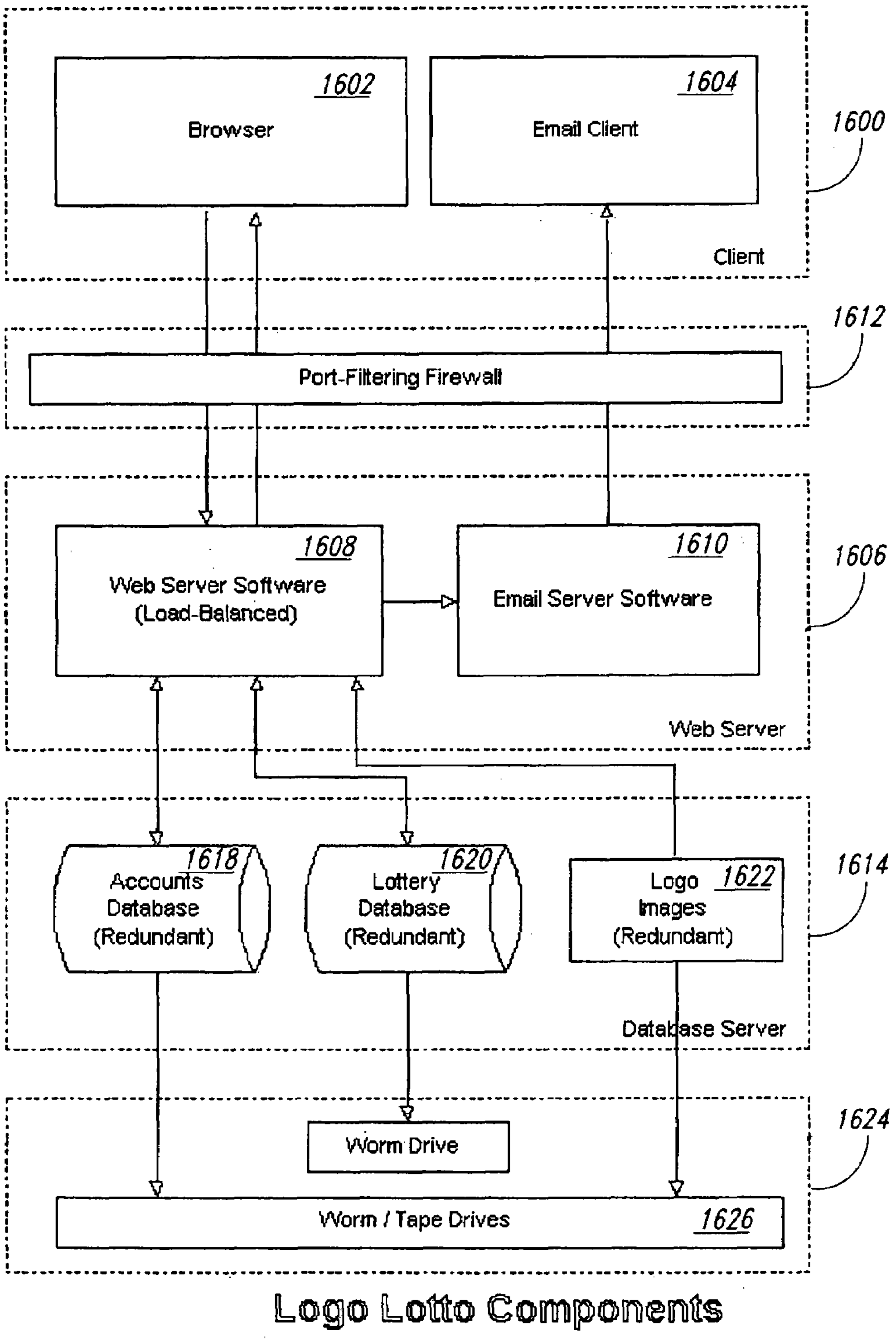

FIG. 16 shows an environment wherein the processes and devices described herein may be practiced.

Figure 17A:
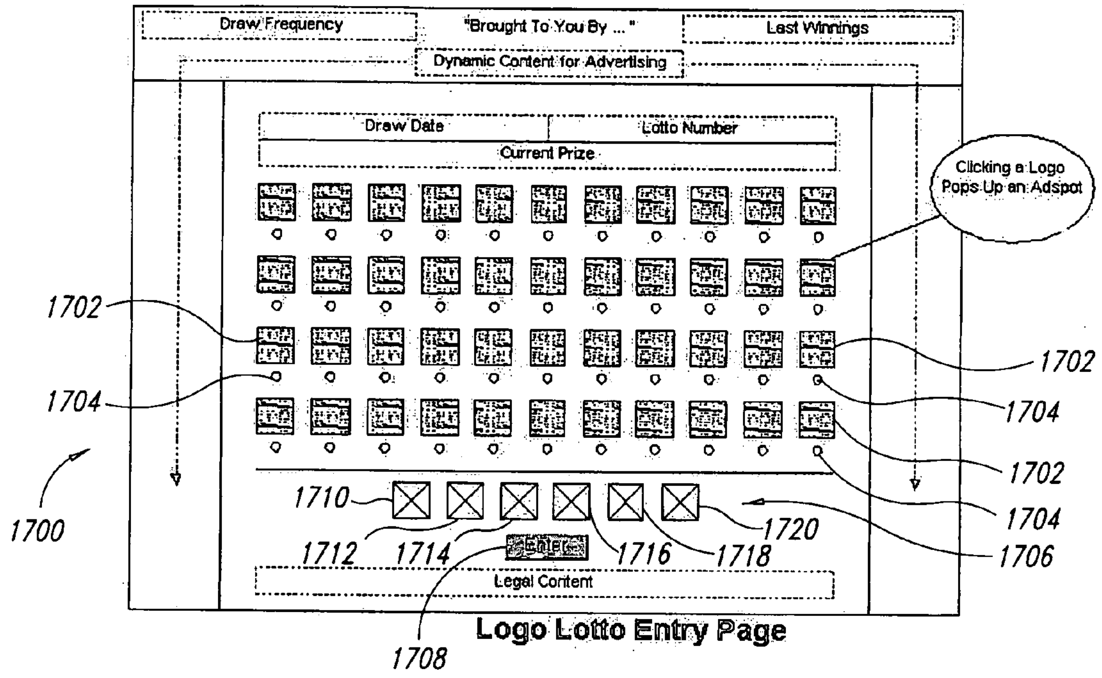

FIG. 17A depicts a visual interface 1700 analogous to the visual interfaces depicted in FIGS. 2A–F.

Figure 17B:
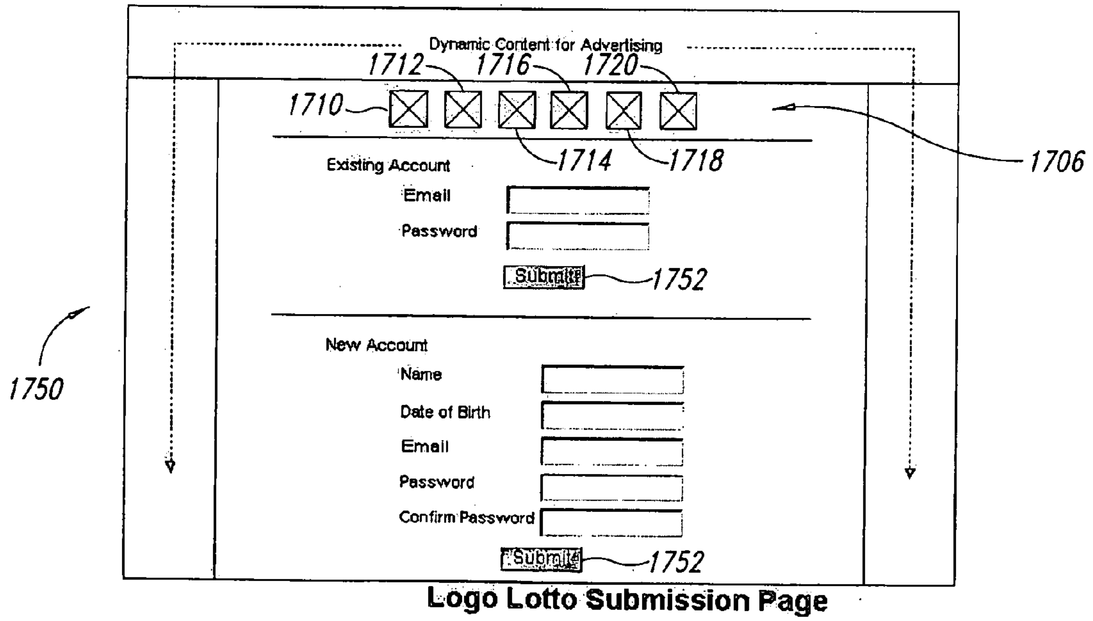

FIG. 17B illustrates a visual interface 1750 showing a lottery submission page.

Figure 18A:
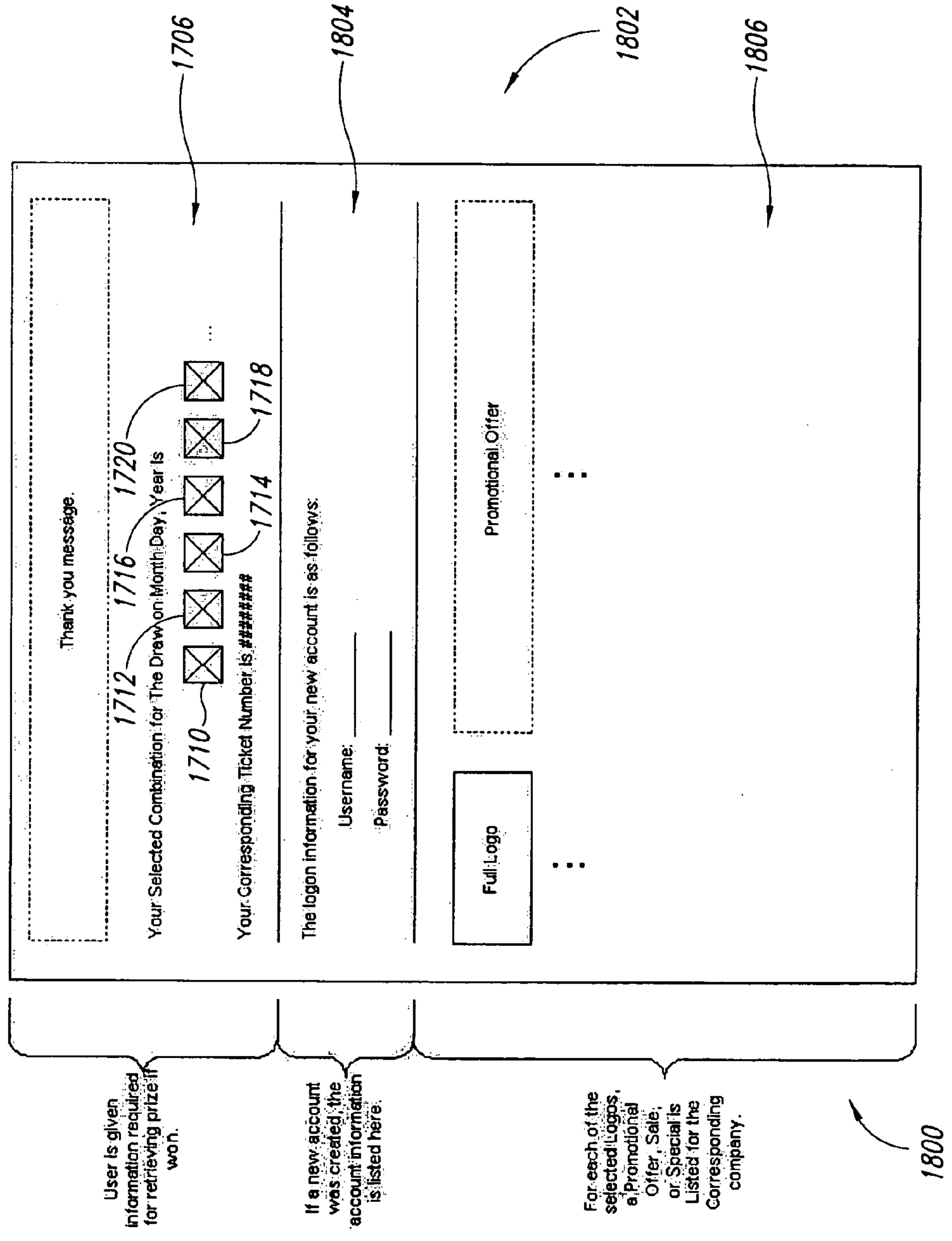

FIG. 18A shows a visual interface 1800 depicting a lotto confirmation e-mail 1802.

Figure 18B:
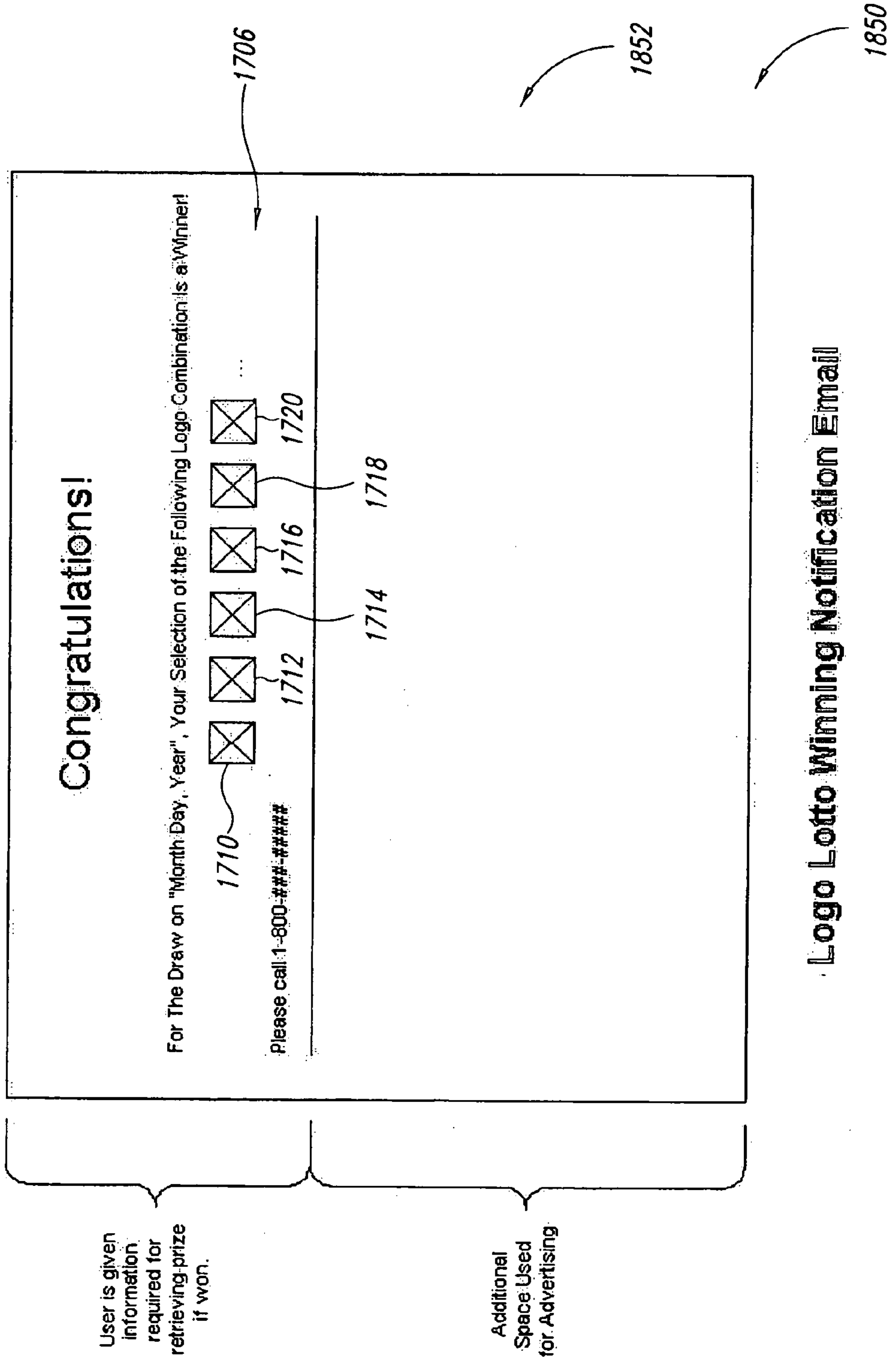

FIG. 18B shows a visual interface 1850 containing a logo Lotto winning notification e-mail 1852.

The use of the same symbols in different drawings typically indicates similar or identical items.

DETAILED DESCRIPTION OF THE INVENTION

Figure 1:
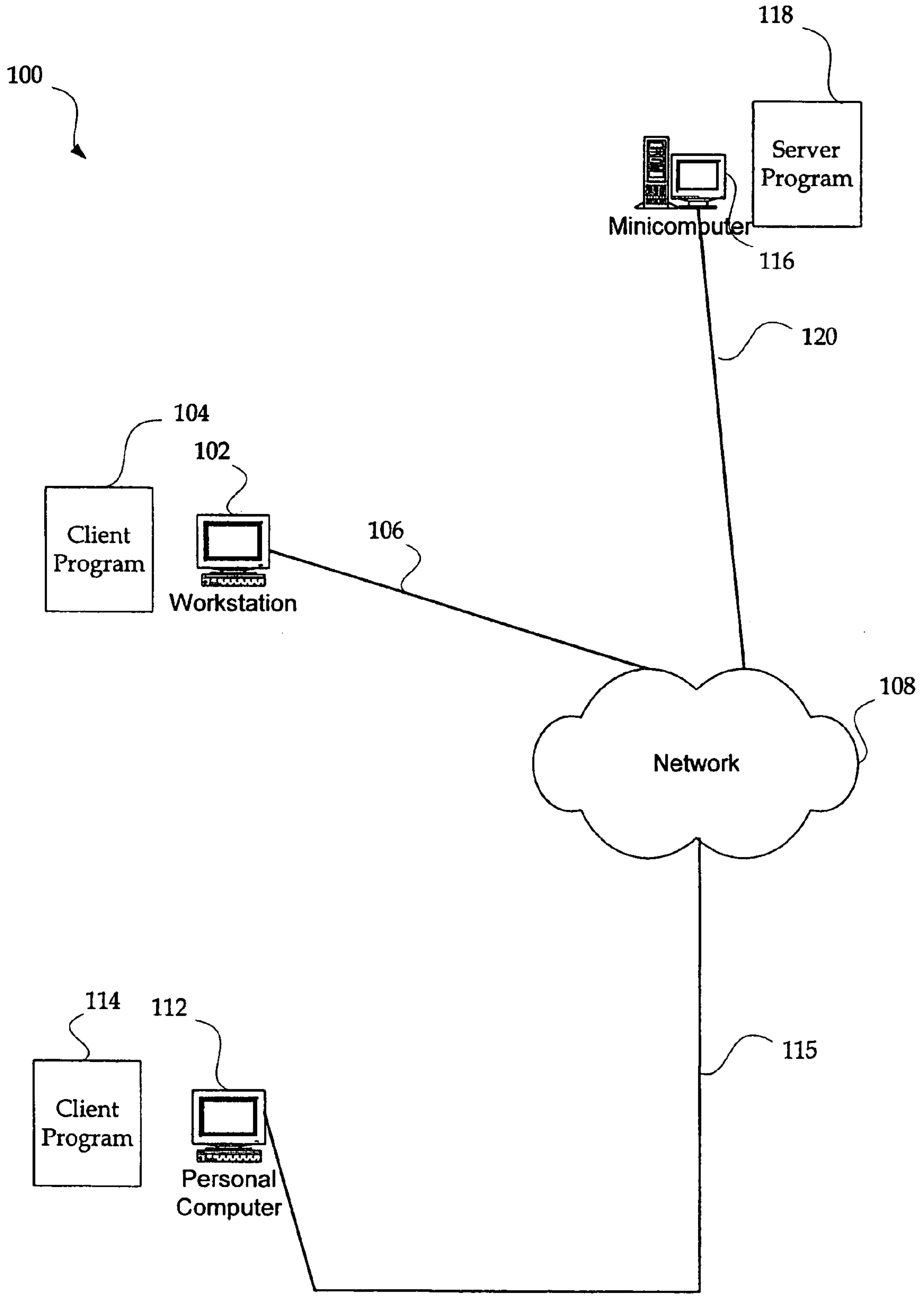
FIG. 1 shows an environment 100 wherein processes and devices described herein may be utilized.

Referring now to FIG. 1, shown is an environment 100 wherein processes and devices described herein may be utilized. Depicted is a workstation data processing system 102 upon which is executing a client program (e.g., software) 104. Illustrated is that the workstation data processing system 102 has a data communications link 106 with a data communications network (e.g., a Wide Area Network (WAN), such as a private WAN or the public Internet (an internetworked agglomeration of subnetworks, which can be treated as a large LAN)) 108.

Illustrated is a personal computer data processing system 112 upon which is executing a client program (e.g., software) 114. Illustrated is that the workstation data processing system 112 has a data communications link 115 with the data communications network 108.

Shown is a minicomputer data processing system 116 upon which is executing a server program (e.g., software) 118. Illustrated is that the minicomputer data processing system 116 has a data communications link 120 with the data communications network 108.

With respect to the depicted environment, those having ordinary skill in the art will appreciate that although only a few data processing systems, and associated client programs, are shown, in an actual implementation it is likely that several data processing systems and associated client programs will be present. Those having ordinary skill in the art will also appreciate that although only one server program is shown, more than one server program running on more than one minicomputer could be present (e.g., redundant and/or distributed systems could be maintained). Lastly, those having ordinary skill in the art will recognize that the environment depicted has been kept simple for sake of conceptual clarity, and hence is not intended to be limiting.

Following are a series of flowcharts depicting implementations of processes and/or devices. For ease of understanding, the flowcharts are organized such that the initial flowcharts present implementations via an overall “big picture” viewpoint and thereafter the following flowcharts present alternate implementations and/or expansions of the “big picture” flowcharts as either sub-steps or additional steps building on one or more earlier-presented flowcharts. Those having ordinary skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of how to make and use the various process and/or device implementations without undue experimentation.

Referring now to FIG. 2, depicted is a high-level logic flowchart illustrating a process. Method step 200 shows the start of the process. Method step 202 depicts populating a lottery bet slip by use of at least one commercial icon. Method step 204 illustrates the end of the process.

Figure 2A:
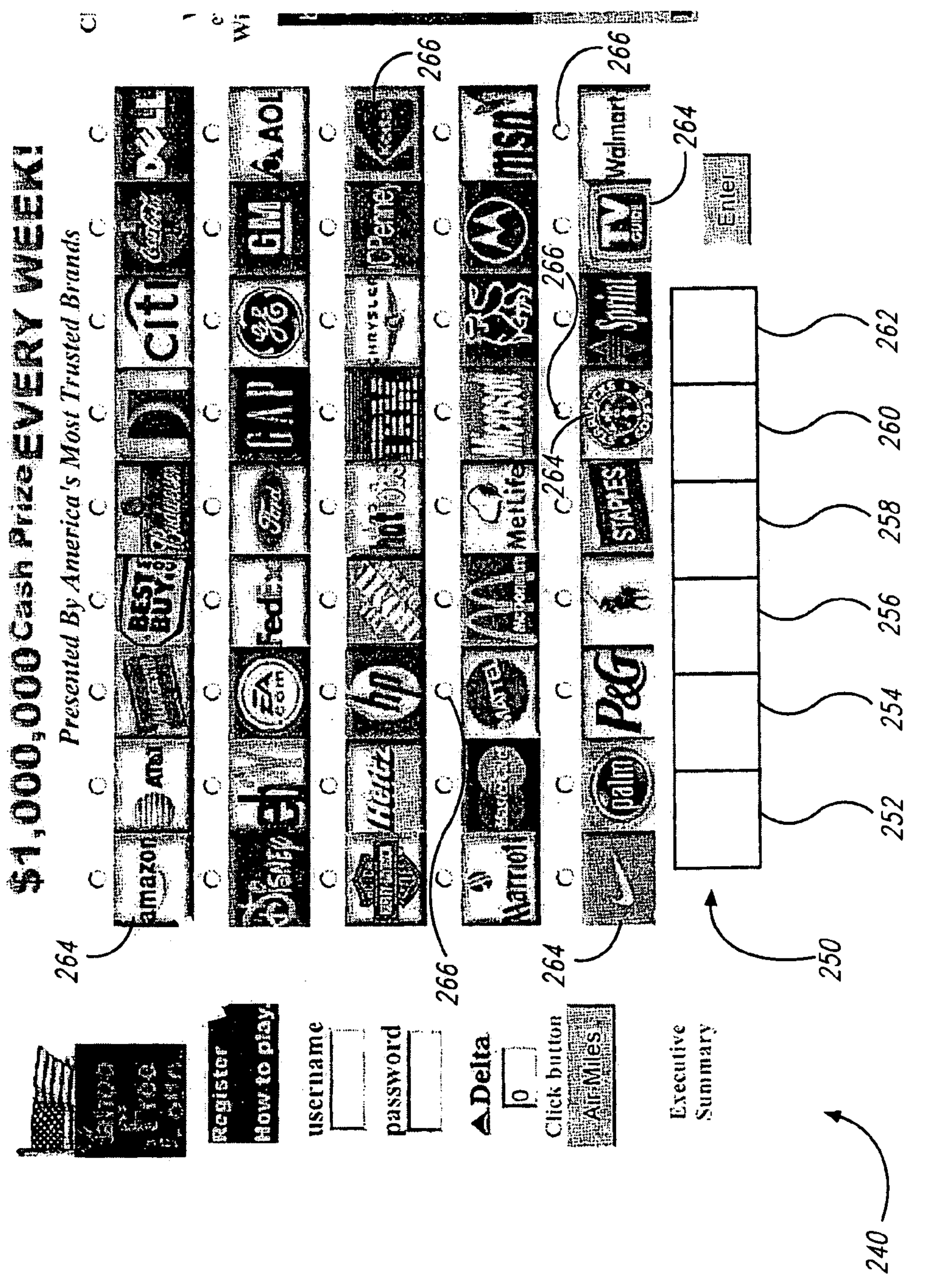

With reference now to FIGS. 2A–F, illustrated are a series of screenshots of a GUI 240 used in one implementation of method step 202 (populating a lottery bet slip by use of at least one commercial icon). Depicted in the FIG. 2A is a lottery bet slip 250, having lottery bet-slip panels 252–262. Illustrated are commercial icons 264 and associated GUI buttons 266.

Figure 2B:
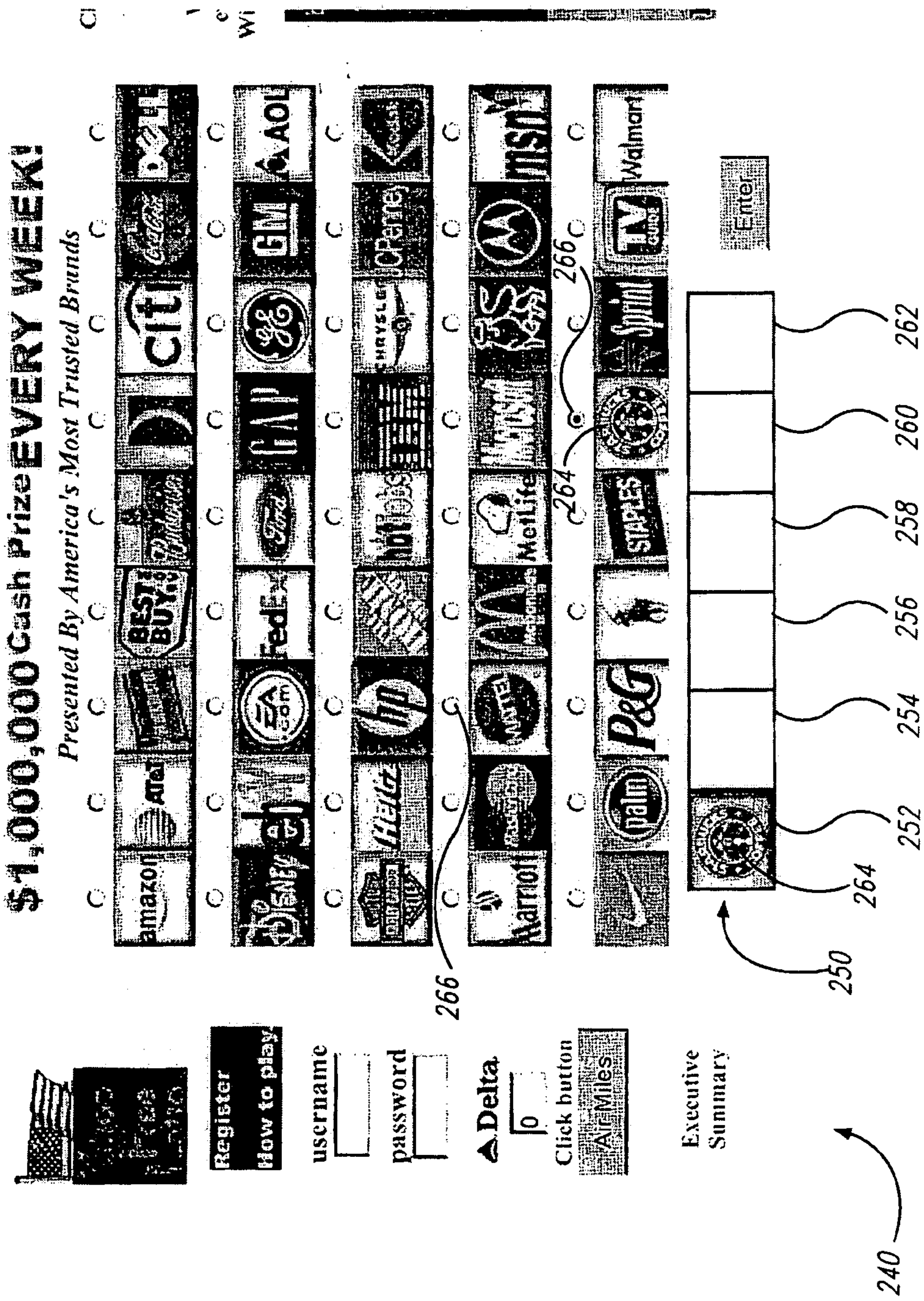

Referring now to FIG. 2B, shown is a screenshot of the GUI 240 of FIG. 2A. Depicted is that the GUI button 266, directly above the Starbucks commercial icon 264, has been activated, which is typically achieved via a user using a mouse to click on the GUI button 266. Illustrated is that in response to the activation of the GUI button 266, directly above the Starbucks commercial icon 264, a first lottery bet-slip panel 252 has been populated with the Starbucks commercial icon 264.

Figure 2C:
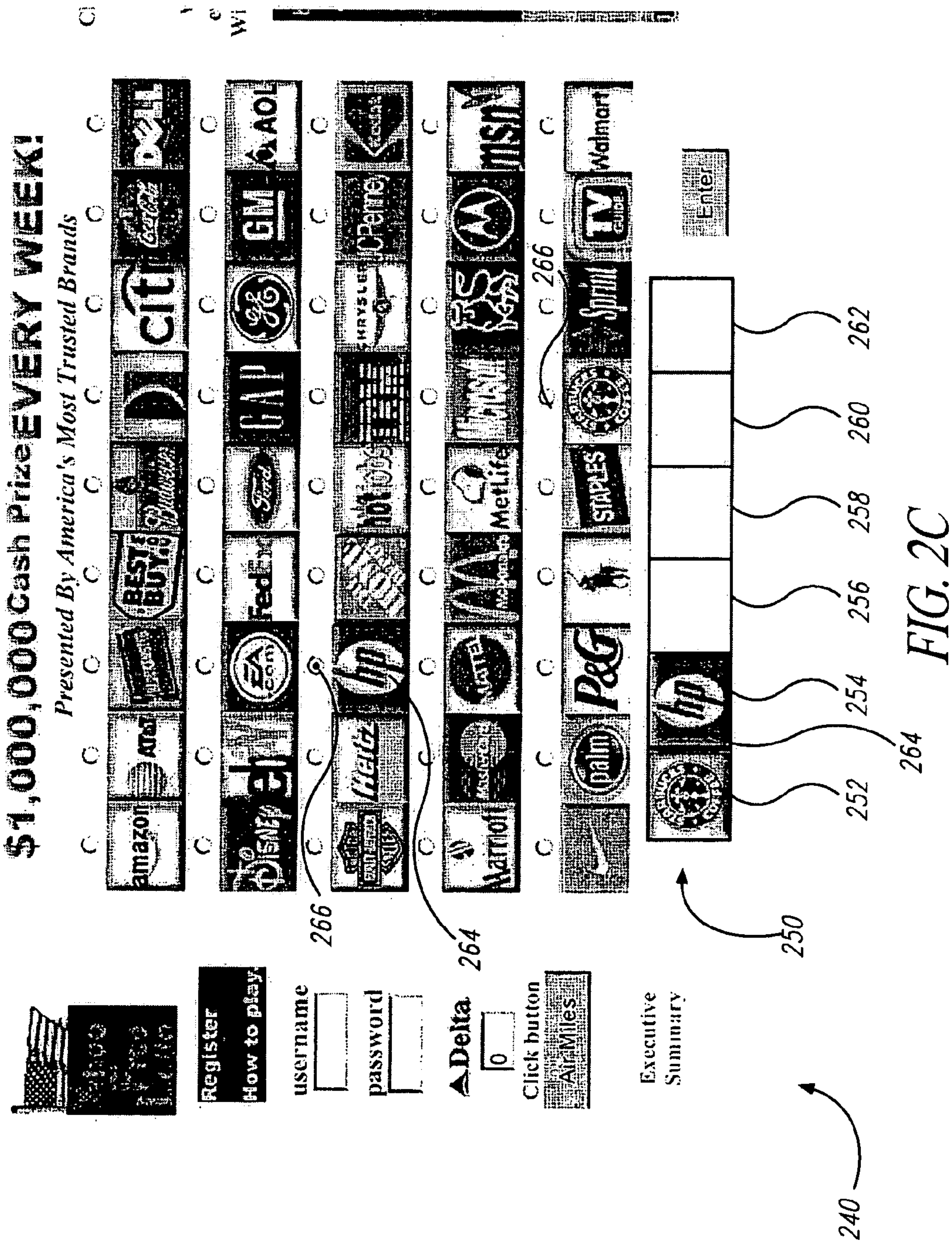

With reference now to FIG. 2C, depicted is a screenshot of the GUI 240 of FIG. 2B. Illustrated is that GUI button 266, directly above the HP commercial icon 264, has been activated, which is typically achieved via a user using a mouse to click on the GUI button 266. Shown is that in response to the activation of the GUI button 266, directly above the HP commercial icon 264, a second lottery bet-slip panel 254 has been populated with the HP commercial icon 264.

Figure 2D:
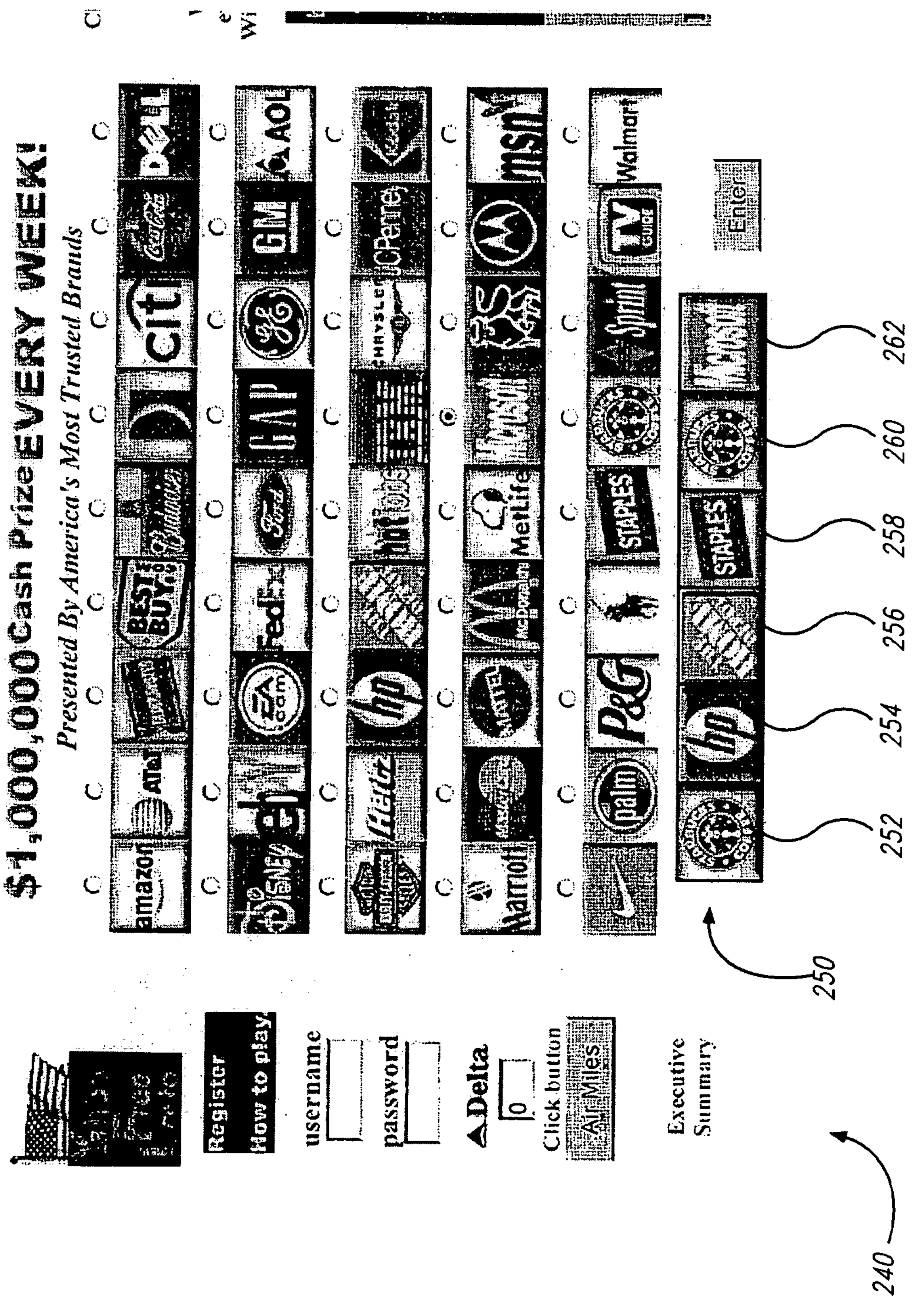

Referring now to FIG. 2D, illustrated is a screenshot of the GUI 240. Shown is that a third lottery bet-slip panel 256, a fourth lottery bet-slip panel 258, a fifth lottery bet-slip panel 260, and a sixth lottery bet-slip panel 262 have been respectively populated with the Home Depot commercial icon 264, the Staples commercial icon 264, the Starbucks commercial icon 264, and the Microsoft commercial icon 264. The third through sixth lottery bet-slip panels 256–262 have been populated via a process analogous to the processes described in relation to FIGS. 2B–C.

Figure 2E:
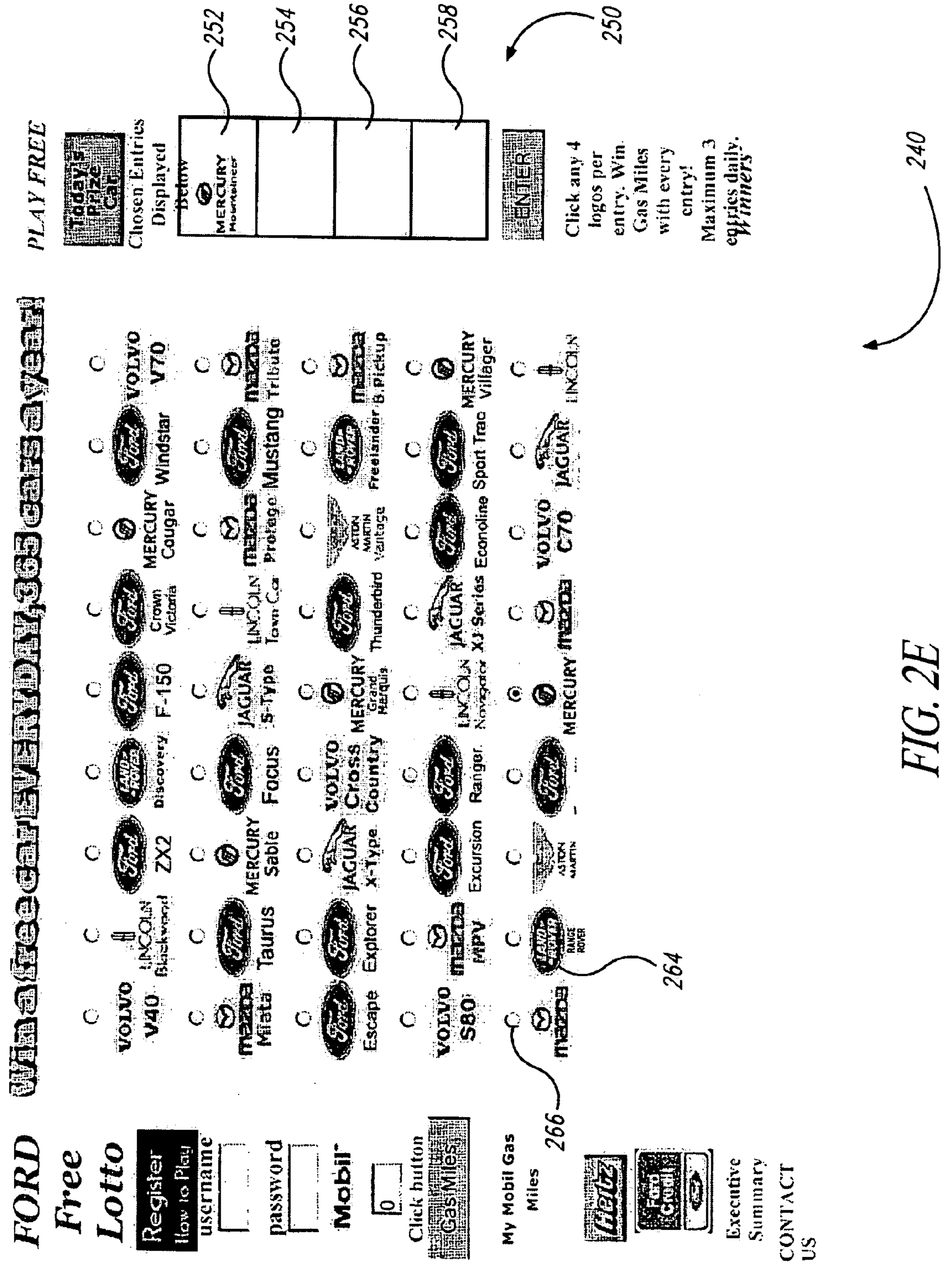
Figure 2F:
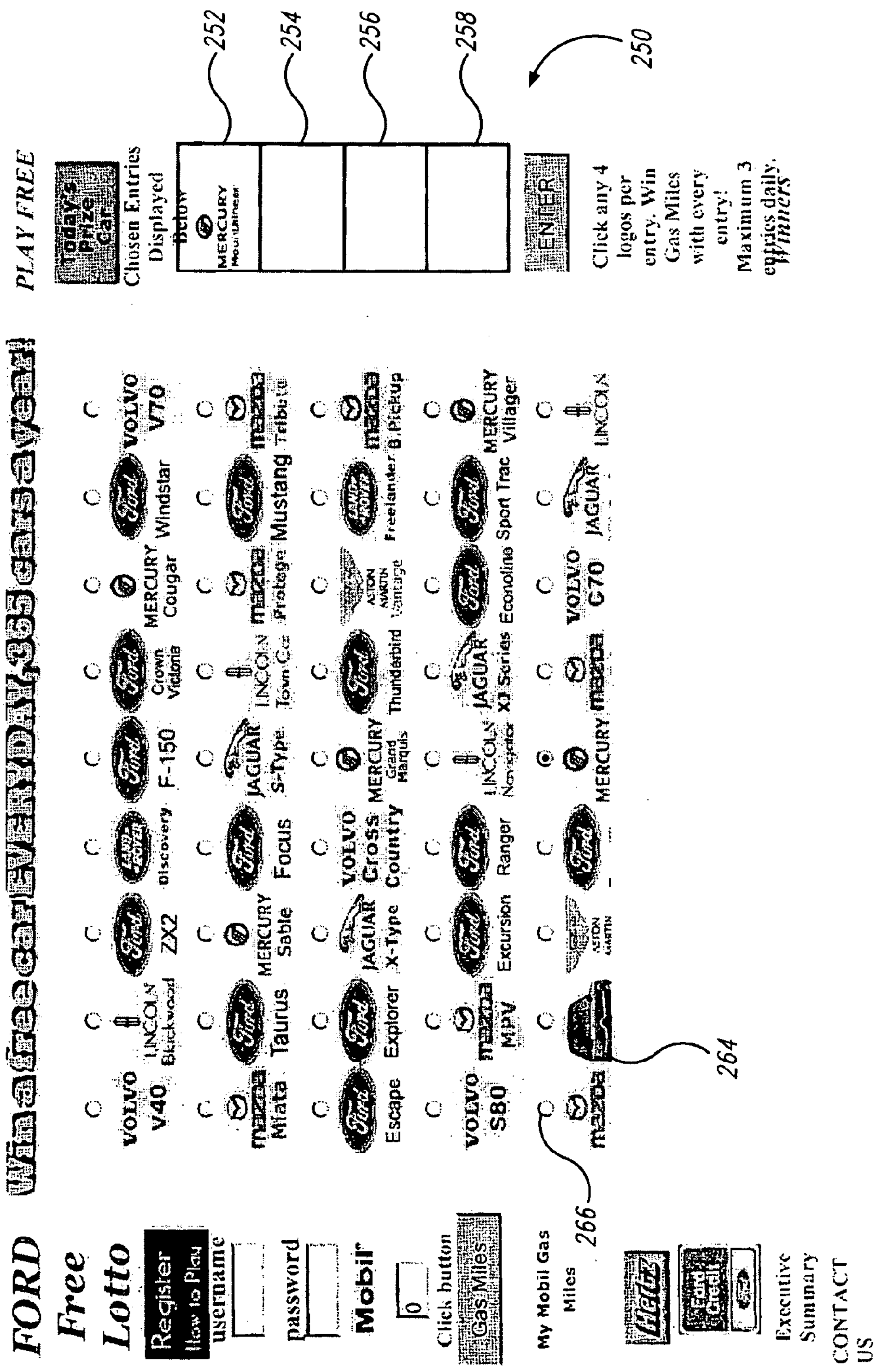

With reference now to FIG. 2E–F, shown are screenshots of an alternate example of the GUI 240. Shown in FIG. 2E are automobile-related commercial icons 264. Illustrated is a lottery bet slip 250 having lottery bet-slip panels 252–258.

Referring now to FIG. 2F, depicted is a screenshot of the GUI 240 of FIG. 2E, wherein the Land Rover Range Rover commercial icon 264 of FIG. 2E is depicted as having been replaced with a second Land Rover Range Rover commercial icon 264 which consists of a GIF (graphical image file) of an actual Land Rover Range Rover vehicle. In one implementation, the foregoing is achieved via "flyover"; that is, when a cursor is positioned over the first Land Rover Range Rover commercial icon 264 of FIG. 2E, the first Land Rover Range Rover commercial icon 264 is replaced with the second Land Rover Range Rover commercial icon 264 (i.e. the chest) shown in FIG. 2F.

Those skilled in the art will appreciate that the GUIs of FIGS. 2A–F are merely exemplary, and that many other equally serviceable GUIs may be produced in light of the teachings set forth herein. In addition, in various implementations the commercial icons 264 depicted in FIGS. 2A–F serve as hyperlinks to the various vendors whose products are displayed (e.g., the Ford Explorer icon would serve as a hyperlink to the Ford Motor Company web site, the Microsoft icon would serve as a hyperlink to the Microsoft Inc. web site, the Starbucks icon would serve as a hyperlink to the Starbucks Co. web site, etc. Furthermore, it is to be understood that when the term "icon," or "commercial icon," is used herein, it is implicit that the "icon" or "commercial icon" can serve as a hyperlink to another web site, such as a commercial web site.

FIGS. 2A–F have illustrated examples of commercial icons. However, as used herein, the scope of the term "commercial icon" can include but is not limited to: a trademark; or a service mark; a commercial name (e.g., a corporate or business name); a commercial logo (e.g., corporate or business logo); a commercial slogan (e.g., business or corporate slogan); a geographical mark (e.g., city name and/or logo); a commercial image (e.g., celebrity image, or automobile image); a book cover; a compact disk cover; a digital videodisk cover; a movie poster; a new movies release list; a new music release list; and a generic icon (e.g., an Olympic event, a career designation, or a university name, etc.) which constitutes a hyperlink to a commercial site, etc.

One way to conceive of the term "commercial icon," as used herein, is to regard it as any icon which has a commercial and/or monetary value independent of the fact that the icon is being used in a game of chance. One example of how such value could arise would be that the icon is associated with a commercial entity (as used herein, the term "commercial entity" includes nonprofit entities which, although they do not operate for profit, do indeed generate and/or disgorge monies). Another example of how such value could arise would be that the icon, although generic in itself, acquires commercial and/or monetary value via its association with a commercial entity, such as by serving as a hyperlink to the commercial entity's web site.

In addition, although the term icon is generally conceived as primarily visual in nature, as used herein the term "commercial icon" is also intended to encompass one or more sounds which have a commercial and/or monetary value independent of the fact that the sounds are being used in a game of chance. One example of how such value could arise would be that the sounds are associated with a commercial entity (e.g., an advertising slogan or jingle). Another example of how such value could arise would be that the sounds, although generic in themselves, acquire commercial and/or monetary value via their association with a commercial entity such as by serving as a hyperlink to the commercial entity's web site (e.g., voice-activated hyperlinks, which are activated by sounds).

In addition to the foregoing, while FIGS. 2A–F have illustrated examples of populating the lottery bet slip with the selected commercial icons 264, in another contemplated implementation, the selection of the commercial icons 264 results in the lottery bet slip being populated with icons, which may be either commercial or non-commercial icons. However, note that in that instance the lottery bet slip is still being populated by use of at least one commercial icon since it is the selection of that at least one commercial icons that results in the population of the lottery bet slip.

With reference now to FIG. 3, illustrated is a high-level logic flowchart showing an alternate implementation of the process depicted in FIG. 2. Depicted is that, in one implementation, method step 202—populating a lottery bet slip by use of at least one commercial icon—is characterized by method steps 300,302, and 304. Method step 300 shows presenting one or more commercial icons. In one implementation of method step 300, the client program 114, executing upon the personal computer data processing system 112, causes presentation of the one or more commercial icons via at least one presentation device of the personal computer data processing system 112. In other implementation of method step 300, a commercial printer causes presentation of the one or more commercial icons via at least one print medium (e.g., via newspapers or magazines). Method step 302 depicts accepting input selecting the at least one commercial icon from the presented one or more commercial icons. Method step 304 illustrates inserting the at least one commercial icon into at least one bet-slip panel of the lottery bet slip. The remaining method steps function as described elsewhere herein.

With reference now to FIG. 4, shown is a high-level logic flowchart depicting alternate implementations of the process depicted in FIG. 3. Illustrated is that, in one implementation, method step 300—presenting one or more commercial icons—is characterized by either method step 400 or 402. Method step 400 shows displaying the one or more commercial icons via a visual interface. In one implementation of method step 400, the one or more commercial icons are displayed via a display device of a data processing system (e.g., the displaying of graphical user interfaces, such as were illustrated in FIG. 2A–F, on the workstation computer 102). In another implementation of method step 400, the one or more commercial icons are displayed via print media such as printed paper. Method step 402 depicts transmitting the one or more commercial icons via an auditory interface. In one implementation of method step 402, the one or more commercial icons are transmitted in auditory prerecorded form via a touch-tone phone. In another implementation of method step 402, the one or more commercial icons are transmitted over an auditory device (e.g., a speaker on the workstation computer 102) via a text-to-speech interface provided by server program 118 running on minicomputer data processing system 116 which a user is accessing via a voice over IP communications link. The remaining method steps function as described elsewhere herein.

With reference now to FIG. 5, shown is a high-level logic flowchart depicting alternate implementations of the process depicted in FIG. 3. Illustrated is that, in one implementation, method step 302—accepting input selecting the at least one commercial icon from the presented one or more commercial icons—is characterized by either method step 500 or 502. Method step 500 shows accepting input selecting one or more option indicators respectively associated with the presented one or more commercial icons via a visual interface. In one implementation of method step 500, the client program 114 accepts the input via user manipulation of GUI buttons associated with the one or more commercial icons by use of graphical user interfaces 240 in the fashion illustrated and described in relation to FIGS. 2A–F. In another implementation of method step 500, a printed-paper form accepts the input via a user writing an identifier associated with each of the one or more commercial icons into bet-slip panels on the printed-paper form. Method step 502 depicts accepting input selecting one or more option indicators respectively associated with the presented one or more commercial icons via an auditory. In one implementation of method step 502, the selection of the one or more option indicators respectively associated with the one or more commercial icons is accepted via a user touching keys on a touch-tone phone. In another implementation of method step 502, the selection of the one or more option indicators respectively associated with the one or more commercial icons is accepted via a user speaking into an auditory device (e.g., a microphone on the workstation computer 102) which feeds into a text-to-speech interface provided by the server program 118, running on the minicomputer data processing system 116, which the user is accessing via a voice over IP communications link. The remaining method steps function as described elsewhere herein.

With reference now to FIG. 6, shown is a high-level logic flowchart depicting alternate implementations of the process depicted in FIG. 3. Illustrated is that, in one implementation, method step 304—inserting the at least one commercial icon into at least one bet-slip panel of the lottery bet slip—is characterized by either method step 600 or 602. Method step 600 shows presenting the lottery bet slip having at least one bet-slip panel filled with the at least one commercial icon by displaying the lottery bet slip via a visual interface. In one implementation of method step 600, the lottery bet slip is displayed via a display device of a data processing system (e.g., via displaying graphical user interfaces having bet-slip panels filled with commercial icons 264, such as were illustrated in FIG. 2B–F, on workstation computer 102). In another implementation of method step 600, the lottery bet slip is displayed via print media such as a printed-paper form, where the bet-slip panels of the form have been filled in by a user. Method step 602 depicts presenting the lottery bet slip having at least one bet-slip panel filled with the at least one commercial icon by transmitting the lottery bet slip via an auditory interface (e.g., transmitting via telephone or speech recognition interface). In one implementation of method step 602, the lottery bet slip having at least one bet-slip panel filled in with the at least one commercial icon is transmitted in auditory prerecorded form via a touch-tone phone. In another implementation of method step 402, the lottery bet slip having at least one bet-slip panel filled in with the at least one commercial icon is transmitted over an auditory device (e.g., a speaker on workstation computer 102) via a text-to-speech interface provided by the server program 118, running on the minicomputer data processing system 116, which a user is accessing via a voice over IP communications link. An example of the foregoing would be either the prerecorded form or the text-to-speech interface making a statement to the effect of "your bet slip currently contains Starbucks, Hewlett-Packard, Home Depot, Staples, Starbucks, and Microsoft; is this what you intended? If not, please re-enter your selection," after which the user would respond using either the touch-tone keypad, or voice, or GUI input as appropriate. The remaining method steps function as described elsewhere herein.

With reference now to FIG. 7, illustrated is a high-level logic flowchart showing an alternate implementation of the process depicted in FIG. 2. Depicted is that in one implementation the process includes method step 700. Method step 700 shows betting the lottery bet slip. In one implementation of method step 700, the betting is done electronically (e.g. via interaction between client program 104, running on the workstation data processing system 102, and the server program 118, running on the minicomputer 116. In another implementation of method step 700, the betting is done manually (e.g., via a user mailing in her bet slip, or delivering her bet slip by hand, to a lottery authority). The remaining method steps function as described elsewhere herein.

With reference now to FIG. 8, shown is a high-level logic flowchart depicting alternate implementations of the process depicted in FIG. 7. Illustrated is that, in one implementation, method step 700, betting the lottery bet slip, is characterized by either method step 800 or method step 802. Method step 800 shows accepting input which triggers said betting via a visual interface. In one implementation of method step 800, the client program 114 accepts input, which triggers the betting, via user activation of a GUI command button (e.g., the "enter" GUI command button illustrated in the various versions of the GUI 240 depicted in FIGS. 2A–F). In another implementation of method step 800, a lottery authority accepts either via the mail, or by hand delivery, a printed-paper form from a user, where the printed-paper form contains the one or more commercial icons entered into bet-slip panels of a printed-media lottery bet slip. Method step 802 depicts accepting input which triggers said betting via an auditory interface. In one implementation of method step 802, the input which triggers said betting is accepted via a user touching buttons on a touch-tone phone. In another implementation of method step 502, the input which triggers said betting is accepted via a user speaking into an auditory device (e.g., a microphone on the workstation computer 102) which feeds into a text-to-speech interface provided by the server program 118, running on the minicomputer data processing system 116, which the user is accessing via a voice over IP communications link. The remaining method steps function as described elsewhere herein.

With reference now to FIG. 9, shown is a high-level logic flowchart depicting an alternate implementation of the process depicted in FIG. 7. Illustrated is that, in one implementation, method step 700—betting the lottery bet slip—is characterized by method step 900. Method step 900 shows submitting the lottery bet slip to a lottery administrator (e.g., by transmitting the lottery bet slip to the lottery administrator server program via a communications link). In one implementation of method step 900, the lottery administrator is effected by the server program 118, running on the minicomputer data processing system 116, and the submitting is accomplished via e-mail communication over the network 108 (e.g., the Internet). In another implementation of method step 900, the lottery administrator is a corporate entity having human employees, and hence the submitting is done manually (e.g., via mail or hand delivery). The remaining method steps function as described elsewhere herein.

Referring now to FIG. 10, depicted is a high-level logic flowchart illustrating a process. Method step 1000 shows the start of the process. Method step 1002 depicts comparing a lottery bet slip, populated with one or more commercial icons, against one or more winning criteria. Method step 1004 illustrates the end of the process.

With reference now to FIG. 11, illustrated is a high-level logic flowchart showing an alternate implementation of the process depicted in FIG. 10. Depicted is that, in one implementation, method step 1002—depicts comparing a lottery bet slip, populated with one or more commercial icons, against one or more winning criteria—is characterized by method steps 1100, 1102, and 1104. Method step 1100 shows receiving the lottery bet slip via a communications link. In one implementation of method step 1100, the lottery bet slip is received by the server program 118, running on the minicomputer 116, via e-mail communications over the network 108 (e.g., the Internet). In another implementation of method step 1100, the lottery bet slip is received by a corporate entity via mail or hand delivery. Method step 1102 depicts comparing a content and/or position of the one or more commercial icons in bet-slip panels of the lottery bet slip against a content and/or position of any one or more commercial icons in bet-slip panels of a master bet slip. In one implementation of method step 1102, the server program 118, running on the minicomputer 116, electronically compares a content and/or position of the one or more commercial icons in bet-slip panels of the lottery bet slip against a content and/or position of one or more commercial icons in bet-slip panels of the master bet slip. In another implementation of method step 1102, the comparison is done electronically by a machine which compares the content and/or position of any one or more commercial icons in bet-slip panels of the lottery bet slip against a content and/or position of one or more commercial icons in bet-slip panels of the master bet slip. Method step 1104 illustrates logging the one or more commercial icons in the lottery bet slip. In one implementation of method step 1104, the server program 118, running on the minicomputer 116 electronically logs the one or more commercial icons in the bet-slip panels of the lottery bet slip in order to keep track of the commercial icons which are being utilized. In another implementation of method step 1104, a human logs the one or more commercial icons in the lottery bet-slip panels of the lottery bet slip in order to keep track of the commercial icons which are being utilized. The remaining method steps function as described elsewhere herein.

With reference now to FIG. 12, illustrated is a high-level logic flowchart showing alternate implementations of the process depicted in FIG. 10. Depicted is that in one implementation the process includes method step 1200. Method step 1200 shows transmitting a winning notification in response to said comparing showing that at least a part of the one or more winning criteria has been met. In one implementation of method step 1200, the transmission is accomplished by the server program 118, running on the minicomputer 116, sending an e-mail communication sent over the network 108 (e.g., the Internet). In another implementation of method step 1200, the transmission is accomplished by a corporate entity sending a communication through the mail. In yet another implementation of method step 1200, the transmission is done either by a human, or by the server program 118 interacting with a speech-processing program, to transmit the notification via voice signals (e.g., via Internet telephony, or plain old telephone service). The remaining method steps function as described elsewhere herein.

With reference now to FIG. 13, shown is a high-level logic flowchart depicting alternate implementations of the process depicted in FIG. 12. Illustrated is that, in one implementation, method step 1200—transmitting a winning notification in response to said comparing showing that at least a part of the one or more winning criteria has been met—is characterized by method step 1300. Method step 1300 shows transmitting the winning notification when a content and/or position of at least one of one or more commercial icons in bet-slip panels of the lottery bet slip matches a content and/or position of at least one of one or more commercial icons in bet-slip panels of a master bet slip. In one implementation of method step 1300, the server program 118, running on the minicomputer 116, transmits an e-mail containing the winning notification to the e-mail address from which the winning lottery bet slip was received, when the content and/or position of at least one of one or more commercial icons in bet-slip panels of the lottery bet slip matches a content and/or position of at least one of one or more commercial icons bet-slip panels of a master bet slip. In another implementation of method step 1300, a corporate entity sends a letter containing the winning notification to the mailing address associated with the person from which the winning lottery bet slip was received, when the content and/or position of at least one of one or more commercial icons in bet-slip panels of the lottery bet slip matches a content and/or position of at least one of one or more commercial icons in bet-slip panels of a master bet slip. The remaining method steps function as described elsewhere herein.

With reference now to FIG. 14, illustrated is a high-level logic flowchart showing alternate implementations of the process depicted in FIG. 12. Depicted is that in one implementation the process includes method step 1400. Method step 1400 shows transmitting a bet confirmation (e.g., transmitting the bet confirmation with a content of at least one of the one or more commercial icons). In one implementation of method step 1400, the server program 118, running on the minicomputer 116, transmits an e-mail containing the bet confirmation to the e-mail address from which the lottery bet slip was received. In one implementation of method step 1400, the bet confirmation e-mail contains at least one commercial icon, and in another implementation of method step 1400, the at least one commercial icon serves as a hyperlink to another web site. In another implementation of method step 1400, a corporate entity sends the bet confirmation to the mailing address associated with the person from which a bet slip was received. The remaining method steps function as described elsewhere herein.

Referring now to FIG. 15A, shown is a high-level logic flowchart depicting an implementation of a process flow associated with a user betting a lottery bet slip. Method step 1500 depicts the start the process. Method step 1502 illustrates that a client is redirected to a lottery page from a partner's web site; for example, if a user were browsing on the partner's web site and clicked on a hyperlink on the partner's web site indicating that the user desired to play the lottery. Method step 1504 shows that upon arrival at the lottery page, a logo selection page is displayed which contains X Logos (i.e., specific examples of the commercial icons discussed herein) Y available selection boxes (i.e., specific examples of the bet-slip panels discussed herein); for example, as shown in FIG. 17A, and as previously shown in FIGS. 2A–F.

Method steps 1506 and 1508 depict a loop. Method step 1506 illustrates that a client selects a logo by clicking on a GUI radio button (i.e., a specific example of the option indicators discussed herein) associated with a logo; for example, as shown in FIG. 17A, and as previously shown in FIGS. 2A–F. Method step 1508 depicts that, subsequent to the user selecting the logo by clicking its associated radio button (e.g., as described in method step 1506), the selected logo is displayed in a selection area; for example, in the selection boxes 1710–1720 shown in FIG. 17A, and as previously shown in relation to FIGS. 2A–F.

Method step 1510 illustrates that subsequent to the user filling the available selection boxes via the loop illustrated by method steps 1506 and 1508, the user submits the selection by clicking an "enter" command button for example, the "enter" GUI command button 1708 shown in FIG. 17A, and as discussed previously herein. Method step 1512 depicts that a submission page is shown, where the submission page is shown as containing the user-selected combination of logos as displayed in selection boxes 1710–1720, as well as user-specific logon fields; for example, as shown in FIG. 17B.

Method step 1514 depicts the inquiry as to whether the user already has a lottery game account. In the event that the user does already have a lottery game account, illustrated is that the process proceeds to method step 1516 wherein it is shown that the user enters an e-mail address and password to validate that the user does indeed already have an account. In event that the user does NOT already have a lottery game account, shown is that the process proceeds to method step 1518 wherein it is shown that the user enters various personal information to be associated with his e-mail address, as well as a password; for example, as shown in FIG. 17B.

Depicted is that, subsequent to either method step 1516 or method step 1518, the process proceeds to method step 1520 wherein it is shown that the selection is submitted to a lottery-authority server by clicking a GUI command button; for example, by clicking on the "submit" GUI command button 1752 shown in FIG. 17B. Method step 1522 shows that the lottery entry is added to a database for the lottery, and a unique alphanumeric ticket number is generated using the date, and user name, the logo combination, and the entry key in the database. Thereafter, method step 5 1524 depicts that a confirmation e-mail is sent to the user containing the user's selected combination of logos, ticket number, when the lottery will take place, and how the results can be viewed; for example, the confirmation e-mail 1802 shown in FIG. 18A. Method step 1526 illustrates the end of the process.

Referring now to FIG. 15B, shown is a high-level logic flowchart depicting an implementation of a process flow associated with a lottery-authority server drawing one or more winning lottery tickets. Method step 1550 shows the start of the process. Method step 1552 depicts that, in one implementation, the lottery-winning logo combination is selected by a third party accounting firm (e.g., Arthur Andersen, or Price Waterhouse). Method step 1554 illustrates that subsequent to the selection of the lottery-winning logo combination, the winning tickets are retrieved from the database.

Method step 1556 depicts the inquiry as to whether or not multiple winners of the lottery were detected in method step 1554. In the event that multiple winners were NOT detected shown is that (i.e., there was a single winner) the process proceeds to method step 1558. Method step 1558 shows that the single winner is notified and informed of methods of obtaining the lottery prize; for example, such as is shown in the confirmation e-mail 1802 shown in FIG. 18A. Thereafter the process proceeds to method step 1560 wherein it is depicted that the winning ticket number(s)—of the people who are actually to receive prizes (in some instances, even though a ticket may hold a winning ticket number, not every winning ticket will receive a price such as any case of multiple winners and a single and invisible prize (see method steps 1556, 1564, and 1570, described below)—are listed on the main lottery page. Method step 1562 illustrates the end of the process.

In the event that multiple winners were detected in the inquiry of method step 1556, the process proceeds to method step 1564. Method step 1564 depicts the inquiry as to whether or not there is a monetary prize. In event that there is a monetary prize, illustrated is that the process proceeds to method step 1566. Method step 1566 shows that in one implementation the monetary prize is split evenly between winning ticket holders. Thereafter, method step 1568 depicts that the winners are notified and informed of methods of obtaining their prizes. Subsequently, the process proceeds to method step 1560 and continues as described herein.

In the event that the inquiry of method step 1564 yields a determination that there is NO monetary prize involved, illustrated is that the process proceeds to method step 1570. Method step 1570 shows that a final draw takes place to determine a single winner among the winning ticket holders. Thereafter, method step 1572 depicts that the winner is notified and informed of methods of obtaining the prize. Thereafter the process proceeds to method step 1560 and proceeds as described herein.

With reference now to FIG. 16, shown is an environment wherein the processes and devices described herein may be practiced. Depicted is a client computer 1600 (e.g., a personal computer) having a Web browser software component 1602 and an e-mail client software component 1604. Illustrated is a Web server computer (e.g., a minicomputer) 1606 having a load balancing Web-server software component 1608 and an e-mail server software component 1610. Shown is that a port-filtering firewall 1612 is interposed between a client computer 1600 and a Web server computer 1606. Depicted is a database server computer (e.g., a mainframe computer) 1614 having an account database software component 1618, a lottery database software component 1620, and a logo images database 1622. Illustrated is that the database server computer 1614 accesses data storage 1624 which, as shown, may contain worm drives and/or tape drives 1626

Referring now to FIG. 17A, depicted is a visual interface 1700 analogous to the visual interfaces depicted in FIGS. 2A–F. Illustrated are logos 1702 and radio buttons 1704, which are shown as associated with the logos 1702 and immediately vertically over the radio buttons 1704. Depicted is selection area 1706 shown as having selection boxes 1710–1720. Illustrated is “enter” GUI command button 1708.

With reference now to FIG. 17B, illustrated is a visual interface 1750 showing a lottery submission page. Intended to be depicted is that selection area 1706, having selection boxes 1710–1720, is filled and with a combination of logos selected by the user. Shown are GUI e-mail and password fields for users having an existing account, and GUI name, date of birth, e-mail, password, and confirm password fields for users needing to create a new account.

Referring now to FIG. 18A, shown is a visual interface 1800 depicting a lotto confirmation e-mail 1802. Illustrated is that the confirmation e-mail 802 contains the selection area 1706, having the selection boxes 1710–1720, containing the logos which the user previously submitted as his bet to the lottery, as well as the user’s corresponding ticket number (e.g. such as was discussed above in method steps 1522 and 1524). Depicted is lottery-administration Web server software logon information 1804 for the user’s new account (the lotto confirmation e-mail shown is for the case in which the user has just created a new account; in for the case of an existing user, the information for the user’s new account would not be listed). Illustrated is that, in one implementation, the return e-mail 1802 also has a promotion window 1806 wherein the logos contained within selection area 1706 are listed vertically, and wherein horizontal from each listed logo appears a promotional offer associated with each such vertically-listed logo.

With reference now to FIG. 18B, shown is a visual interface 1850 containing a logo Lotto winning notification e-mail 1852. Depicted is that the winning notification e-mail 1852 contains the selection area 1706 having selection boxes 1710–1720, which is intended to represent the selection boxes 1710–1720 containing the logos which the user previously submitted as his bet to the lottery. Further depicted is that the user’s informed that he is a lottery winner, and that he is given a telephone number to call about his winning status.

Those having ordinary skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having ordinary skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as one or more computer programs running on one or more computers (e.g., as one or more programs running on one or more computer systems), as one or more programs running on one or more controllers (e.g., microcontrollers) as one or more programs running on one or more processors e.g., microprocessors, as firmware, or as virtually any combination thereof, and that designing the circuitry and/or writing the code for the software and or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analogue communication links using TDM or IP based communication links (e.g., packet links).

In a general sense, those skilled in the art will recognize that the various embodiments described herein which can be implemented, individually and/or collectively, by a wide range of hardware, software, firmware, or any combination thereof can be viewed as being composed of various types of “electrical circuitry.” Consequently, as used herein “electrical circuitry” includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into data processing systems. That is, the devices and/or processes described herein can be integrated into data processing systems via a reasonable amount of experimentation.

With reference now again to FIG. 1, depicted are pictorial representations of conventional data processing systems in which portions of the illustrative embodiments of the devices and/or processes described herein may be implemented. It should be noted that graphical user interface systems (e.g., Microsoft Windows operating systems) and methods can be utilized with the data processing system depicted in FIG. 1. The data processing systems depicted include at least system unit housings, video display devices, keyboards, mice, and microphones. The data processing systems may be implemented utilizing any suitable commercially available computer system.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. For example, although embodiments herein have been shown in the context of data processing devices running client-server software, the teachings herein may be extended to the use of wireless devices (e.g., web-enabled wireless phones, or wireless personal digital assistants), or other types of computational devices (e.g., DirecTV devices, or personal digital assistants), without undue experimentation. As another example, although embodiments have been shown in the context of a lottery, the teachings herein may be extended to other games without undue experimentation. For example the teachings may be extended to encompass "logo" roulette, where instead of the indicator coming to rest on number (e.g., #16) as in normal roulette, the indicator comes to rest on a commercial icon (e.g., COKE), where the commercial icon may further be a 'value icon,' having some associated value that serves somewhat the function of the old-style number (e.g., #16). In addition, the teachings may be extended to encompass "logo" bingo, where the predetermined numbers, that are ordinarily set on a regular bingo card, are replaced with commercial icons (which can be "value icons," having some associated number that serves somewhat the function of the old-style number), and where the numbers on the pieces the player used to match the bingo card are also replaced with commercial icons (which may be "value icons"). In addition, the teachings may be extended to encompass logo instant win (or "logo" scratch cards), where the hidden symbols generally used in such games are replaced with commercial icons, which may be value icons. In the data-processing-system implemented version of this scheme, the cursor is used to scratch off the 'vinyl' covering. In addition, the teachings herein could be extended to "logo" Keno, where the Keno numbers are replaced with commercial icons (which may be "value icons"). Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for playing a lottery game on a computerized graphical user interface, the method comprising:

providing a plurality of commercial icons for presentation to and selection by a user via the graphical user interface, wherein each commercial icon is associated with an indicated commercial entity, and wherein the plurality of commercial icons are associated with at least two different commercial entities;

receiving a number of indications of a first type of action by the user via the graphical user interface, the received indications of the first type of action by the user identifying respective ones of the commercial icons for inclusion in a user selected combination of commercial icons to be used for playing the lottery game;

determining for the lottery game whether the received indications of the first type of action by the user match at least one winning combination of commercial icons associated with respective commercial entities; and providing an award for playing the lottery game if the received indications of the first type of action by the user match the at least one winning combination of commercial icons associated with respective commercial entities.

2. The method of claim 1, further comprising:

receiving a number of indications of a second type of action by the user identifying respective ones of the commercial icons; and in response to each of the received indications of the second type of action by the user, linking the user to a location on a network corresponding to the respective one commercial icon identified by the received indication.

3. The method of claim 1, further comprising:

receiving a number of indications of a second type of action by the user identifying respective ones of the commercial icons; and in response to each of the received indications of the second type of action by the user, presenting an advertisement.

4. The method of claim 3 wherein the advertisement is associated with a product provided by the commercial entity associated with the commercial icon.

5. The method of claim 3 wherein receiving a number of indications of a first type of action by the user identifying respective ones of the commercial icons comprises receiving an indication that the user has selected a button proximately associated with the respective commercial icon with a cursor and wherein receiving a number of indications of a second type of action by the user identifying respective ones of the commercial icons comprises receiving an indication that the user has selected the respective commercial icon with the cursor.

6. The method of claim 1, further comprising:

for each of the received indications of the first type of action by the user, providing a promotional offer for a product provided by the commercial entity associated with the commercial icon.

7. The method of claim 1, further comprising:

determining if a subset of the received indications of the first type of action by the user matches a portion of the at least one winning combination; and providing an award if the received indications of the first type of action by the user match at least a portion of the at least one winning combination.

8. The method of claim 1, further comprising:

changing an image in the commercial icons when a cursor is moved over the commercial icon by the user.

9. The method of claim 1 wherein providing a plurality of commercial icons associated with at least two different commercial entities for presentation to and selection by a user comprises presenting an image of at least one of a trademark, a service mark, a commercial name, a commercial logo, a commercial corporate slogan, a geographical mark, a book cover, a compact disc cover, a digital video disc cover, a movie poster, a new movie release list, or a new music release list.

10. The method of claim 9 wherein the presenting of an image comprises presenting the image on a display screen or presenting the image on at least one piece of printed material.

11. The method of claim 1 wherein providing a plurality of commercial icons associated with at least two different commercial entities for presentation to and selection by a user comprises presenting an audio track of at least one of a trademark, a service mark, a commercial name, a commercial logo, a commercial corporate slogan, or a commercial jingle.

12. The method of claim 1, further comprising:

receiving a number of indications of a first type of action by a plurality of additional users identifying respect ones of commercial icons for inclusion in respective user selected combinations of commercial icons before determining whether the received indications of the first type of action by the user match at least one winning combination.

13. The method of claim 1 wherein the user selected combination of commercial icons to be used for playing the lottery game include trademarks associated with the respective commercial entities that distinguish products of the commercial entities from one another.

14. The method of claim 1 wherein receiving the number of indications of the first type of action by the user identifying respective ones of the commercial icons comprises receiving an indication that the user has clicked a button on the graphical user interface that is adjacent to the respective presented commercial icon using a selection device, and wherein receiving the number of indications of the second type of action by the user identifying respective ones of the commercial icons comprises receiving an indication that the user has clicked on the respective presented commercial icon using the selection device.

15. The method of claim 1 wherein providing the award for playing the lottery game if the received indications of the first type of action by the user match the at least one winning combination of commercial icons associated with respective commercial entities comprises providing the award for playing the lottery game if the at least one winning combination includes a plurality of commercial icons associated with a same commercial entity and at least one other commercial icon associated with a different commercial entity.

16. A method for playing a lottery game on a computerized graphical user interface, the method comprising:

providing a plurality of commercial icons for presentation to and selection by a user via the graphical user interface, wherein each commercial icon is associated with a commercial entity, and wherein the plurality of commercial icons are associated with at least two different commercial entities;

receiving a number of indications of a first type of action by the user via the graphical user interface, the received indications of the first type of action by the user identifying respective ones of the commercial icons to be used for playing the lottery game;

receiving a number of indications of a second type of action by the user via the graphical user interface identifying respective ones of the commercial icons;

in response to the received indications of the second type of action by the user, presenting an advertisement; determining for the lottery game whether the received indications of the first type of action by the user match at least one winning combination of commercial icons associated with respective commercial entities; and providing an award for playing the lottery game if the received indications of the first type of action by the user match at least one winning combination of commercial icons associated with respective commercial entities.

17. The method of claim 16 wherein providing a plurality of commercial icons associated with at least one commercial entity for presentation to and selection by a user comprises providing at least one user selectable commercial icon associated with each of at least two different commercial entities for presentation via the graphical user interface on a cellular telephone.

18. The method of claim 16 wherein presenting an advertisement comprises linking the user to a corresponding page of a Website.

19. The method of claim 18 wherein linking the user to a corresponding page of a Website comprises linking the user to the corresponding page of the Website of the commercial entity with which the respective commercial icon is associated.

20. The method of claim 18 wherein linking the user to a corresponding page of a Website comprises linking the user to the corresponding page of the Website of a party that is different from the commercial entity with which the respective commercial icon is associated.

21. The method of claim 16, further comprising, for each of the received indications of the first type of action by the user, providing a promotional offer for a product provided by the commercial entity associated with the respective one commercial icon identified by the received indication.

22. The method of claim 16 wherein at least one of the number of indications of the second type of action by the user is received before at least one of the number of indications of the first type of action by the user.

23. The method of claim 16, further comprising:

receiving a number of indications of a first type of action by a plurality of additional users identifying respect ones of commercial icons for inclusion in respective user selected combinations of commercial icons before providing an award if the received indications of the first type of action by the user match at least one winning combination.

24. The method of claim 16 wherein the identified combination of commercial icons to be used for playing the lottery game include trademarks associated with the respective commercial entities that distinguish products of the commercial entities from one another.

25. The method of claim 16 wherein receiving the number of indications of the first type of action by the user identifying respective ones of the commercial icons comprises receiving an indication that the user has clicked a button on the graphical user interface that is adjacent to the respective presented commercial icon using a selection device, and wherein receiving the number of indications of the second type of action by the user identifying respective ones of the commercial icons comprises receiving an indication that the user has clicked on the respective presented commercial icon using the selection device.

26. The method of claim 16 wherein providing the award for playing the lottery game if the received indications of the first type of action by the user match the at least one winning combination of commercial icons associated with respective commercial entities comprises providing the award for playing the lottery game if the at least one winning combination includes a plurality of commercial icons associated with a same commercial entity and at least one other commercial icon associated with a different commercial entity.

27. The method of claim 16 wherein receiving the number of indications of the second type of action by the user via the graphical user interface identifying respective ones of the commercial icons includes identifying at least one commercial icon from the at least one winning combination that has been selected by the user, the method further comprising:

in response to user selection of the at least one commercial icon from the at least one winning combination, presenting an advertisement on the graphical user interface, the presented advertisement being associated with a commercial entity associated with the selected at least one commercial icon.

28. A computer-readable media storing instructions for causing a computer to facilitate playing of a lottery game on a computerized graphical user interface and advertising, by:

presenting a plurality of commercial icons via the graphical user interface, wherein each commercial icon is associated with a commercial entity, and wherein the plurality of commercial icons are associated with at least two different commercial entities;

sending first type of indications in response to a first type of action by the user via the graphical user interface that identifies respective ones of the commercial icons to form a user defined combination of commercial icons to be used for playing the lottery game;

sending a second type of indication in response to a second type of action by the user identifying respective ones of the commercial icons;

presenting a commercial advertisement on the graphical user interface to the user in response to receipt of the second type of indication;

determining for the lottery game whether the user defined combination formed by the received first type of indications matches at least a portion of at least one winning combination of commercial icons associated with respective commercial entities; and providing an award for playing the lottery game if the user defined combination formed by the received first type of indications matches at least a portion of the at least one winning combination of commercial icons associated with respective commercial entities.

29. The computer-readable media of claim 28 wherein the instructions cause the computer to send the first type of indications in response to the user respectively selecting a button proximately associated with the respective commercial icon with a cursor and cause the computer to send the second type of indication in response to the user selecting the respective commercial icon with the cursor.

30. The computer-readable media of claim 28 wherein the user selected combination of commercial icons to be used for playing the lottery game include trademarks associated with the respective commercial entities that distinguish products of the commercial entities from one another.

31. The computer-readable media of claim 28 wherein the instructions cause the computer to send the first type of indications in response to the user respectively clicking on a button on the graphical user interface that is adjacent to the respective presented commercial icon using a selection device, and cause the computer to send the second type of indication in response to the user clicking on the respective presented commercial icon using the selection device.

32. The computer-readable media of claim 15 wherein the instructions to cause the computer to provide the award for playing the lottery game if the user defined combination matches the at least a portion of the at least one winning combination of commercial icons associated with respective commercial entities include instructions to:

provide the award for playing the lottery game if the at least one winning combination includes a plurality of commercial icons associated with a same commercial entity and at least one other commercial icon associated with a different commercial entity.

* * * * *